United States Patent
Wu

(10) Patent No.: US 9,843,670 B2
(45) Date of Patent: Dec. 12, 2017

(54) METHOD AND APPARATUS FOR SETTING COLOR RING BACK TONE AND DETERMINING COLOR RING BACK TONE MUSIC

(71) Applicant: Huawei Technologies Co., Ltd., Shenzhen (CN)

(72) Inventor: Bin Wu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/281,911

(22) Filed: Sep. 30, 2016

(65) Prior Publication Data

US 2017/0019530 A1    Jan. 19, 2017

Related U.S. Application Data

(63) Continuation of application No. PCT/CN2014/089863, filed on Oct. 30, 2014.

(30) Foreign Application Priority Data

Apr. 2, 2014  (CN) .......................... 2014 1 0130044

(51) Int. Cl.
*H04M 3/42* (2006.01)
*H04M 1/725* (2006.01)
*H04W 4/02* (2009.01)

(52) U.S. Cl.
CPC ... *H04M 3/42017* (2013.01); *H04M 1/72558* (2013.01); *H04M 1/72569* (2013.01);
(Continued)

(58) Field of Classification Search
CPC .......... H04M 3/42051; H04M 1/72572; H04M 1/72569
See application file for complete search history.

(56) References Cited

U.S. PATENT DOCUMENTS

| 2011/0201316 A1* | 8/2011 | Qian | ................. | H04M 3/42017 |
|---|---|---|---|---|
| | | | | 455/414.1 |
| 2013/0016818 A1* | 1/2013 | Cohn | ..................... | H04M 1/65 |
| | | | | 379/88.13 |
| 2015/0201086 A1* | 7/2015 | Abi | ....................... | H04M 7/006 |
| | | | | 370/352 |

FOREIGN PATENT DOCUMENTS

| CN | 101150821 A | 3/2008 |
|---|---|---|
| CN | 101198094 A | 6/2008 |

(Continued)

OTHER PUBLICATIONS

Machine Translation and Abstract of Chinese Publication No. CN101370055, Feb. 18, 2009, 6 pages.

(Continued)

*Primary Examiner* — Asghar Bilgrami

(74) *Attorney, Agent, or Firm* — Conley Rose, P.C.

(57) ABSTRACT

A method comprising acquiring a current value of a context parameter c of a terminal device, where the context parameter c indicates a characteristic of a context in which the terminal device is applied, and the context parameter c includes any one or any combination of the following: a location parameter, an activity parameter, and an environmental parameter; determining a current context of the terminal device according to the current value of the context parameter c; and setting a color ring back tone of the terminal device to color ring back tone music corresponding to the current context. The present disclosure is used to set a color ring back tone.

36 Claims, 8 Drawing Sheets

(52) U.S. Cl.
CPC ... *H04M 1/72572* (2013.01); *H04M 3/42051* (2013.01); *H04W 4/02* (2013.01)

(56) References Cited

FOREIGN PATENT DOCUMENTS

| CN | 101370055 A | 2/2009 |
|---|---|---|
| CN | 101848421 A | 9/2010 |
| CN | 101959158 A | 1/2011 |
| CN | 102857616 A | 1/2013 |
| CN | 102905023 A | 1/2013 |
| CN | 102958011 A | 3/2013 |

OTHER PUBLICATIONS

Machine Translation and Abstract of Chinese Publication No. CN101848421, Sep. 29, 2010, 4 pages.
Machine Translation and Abstract of Chinese Publication No. CN102958011, Mar. 6, 2013, 7 pages.
Gu, J., "Context aware computing," Journal of East China Normal University, No. 5, Sep. 2009, 21 pages.
Schmidt, C., "Context-Aware Computing," 9 pages.
Siewiorek, D., et al., "SenSay: A Context-Aware Mobile Phone," 10 pages.
Foreign Communication From a Counterpart Application, PCT Application No. PCT/CN2014/089863, English Translation of International Search Report dated Feb. 17, 2015, 2 pages.
Foreign Communication From a Counterpart Application, PCT Application No. PCT/CN2014/089863, English Translation of Written Opinion dated Feb. 17, 2015, 8 pages.
Machine Translation and Abstract of Chinese Publication No. CN101150821, Mar. 26, 2008, 5 pages.
Machine Translation and Abstract of Chinese Publication No. CN102857616, Jan. 2, 2013, 7 pages.
Machine Translation and Abstract of Chinese Publication No. CN102905023, Jan. 30, 2013, 15 pages.
Foreign Communication From a Counterpart Application, Chinese Application No. 201410130044.6, Chinese Office Action dated Jun. 21, 2017, 7 pages.

\* cited by examiner

METHOD AND APPARATUS FOR SETTING COLOR RING BACK TONE AND DETERMINING COLOR RING BACK TONE MUSIC

CROSS-REFERENCE TO RELATED APPLICATIONS

This application is a continuation of International Application No. PCT/CN2014/089863, filed on Oct. 30, 2014, which claims priority to Chinese Patent Application No. 201410130044.6, filed on Apr. 2, 2014. The disclosures of the aforementioned applications are hereby incorporated by reference in their entireties.

TECHNICAL FIELD

The present disclosure relates to the terminal field, and in particular, to a method and an apparatus for setting a color ring back tone and determining color ring back tone music.

BACKGROUND

With the rapid development of the terminal industry, a terminal device can provide increasing functions. An existing terminal device is equipped with a large quantity of sensors, for example, a Global Positioning System (GPS) sensor, an acceleration sensor, an ambient light sensor, a sound sensor, a proximity sensor, a compass, and a gyroscope. A tiny change in each sensor may be captured in real time using these sensors on the terminal device, so as to acquire, by means of analysis, context information of a user using the terminal device, that is, a current status and/or a current location of the user. For example, whether an activity status of the user is walking, running, or riding may be analyzed by means of calculation using an acceleration parameter acquired by the acceleration sensor, and whether a location in which the user is located is in the office or at home may be analyzed by means of statistics collection using a GPS, WiFi network information, and base station cell information of a telephone network.

With the promotion of machine learning and data mining technologies, related information of a person and an environment may be easily acquired and analyzed. Subsequently, context awareness calculation emerges. By means of human-computer interaction or using a sensor, the context awareness calculation is provided for a computing device to calculate by means of analysis and predict context information such as an environment and activities of the person and the device, and makes the computing device automatically react accordingly. Therefore, in the terminal device, by means of context awareness calculation and using context information acquired by the terminal device by means of analysis, the device may also be made to automatically react accordingly.

In many service applications of the terminal device, a color ring back tone service, that is, a customized ring back tone service, is a widely used service and is a service in which a called user sets a color ring back tone with a special sound effect (music, a song, a story plot, and a character dialog) for another calling user that calls a mobile telephone of the called user. In an existing color ring back tone service, a color ring back tone is generally set to fixed color ring back tone music. Alternatively, if the called user intends to use different color ring back tone music to express a current status of the user and let a caller have relatively favorable experience, different color ring back tone music needs to be played by means of manual setting by the user in the terminal device in different contexts. However, the different color ring back tone music is manually set by the user in the different contexts, and when the user has multiple activities or a location is frequently changed, manual setting of a color ring back tone is tedious and inconvenient, which leads to extremely low user experience of the terminal device.

SUMMARY

Embodiments of the present disclosure provide a method and an apparatus for setting a color ring back tone, which implements automatic setting of color ring back tone music of a terminal device according to a user context, thereby improving user experience of the terminal device.

The following technical solutions are used in the embodiments of the present disclosure.

According to a first aspect, a method for setting a color ring back tone is provided, including acquiring a current value of a context parameter of a terminal device, where the context parameter indicates a characteristic of a context in which the terminal device is applied, and the context parameter includes any one or any combination of the following: a location parameter, an activity parameter, and an environmental parameter; determining a current context of the terminal device according to the current value of the context parameter; and setting a color ring back tone of the terminal device to color ring back tone music corresponding to the current context.

With reference to the first aspect, in a first possible implementation manner of the first aspect, the setting a color ring back tone of the terminal device to color ring back tone music corresponding to the current context includes setting, according to a correspondence between multiple contexts and a variety of color ring back tone music that are of the terminal device, the color ring back tone of the terminal device to the color ring back tone music corresponding to the current context.

With reference to the first possible implementation manner of the first aspect, in a second possible implementation manner of the first aspect, the setting, according to a correspondence between multiple contexts and a variety of color ring back tone music that are of the terminal device, the color ring back tone of the terminal device to the color ring back tone music corresponding to the current context includes determining, according to the correspondence, a color ring back tone identifier corresponding to a current context identifier, where the correspondence includes a context identifier and a color ring back tone identifier corresponding to the context identifier; and setting the color ring back tone of the terminal device to color ring back tone music indicated by the color ring back tone identifier.

With reference to the first possible implementation manner of the first aspect, in a third possible implementation manner of the first aspect, the setting, according to a correspondence between multiple contexts and a variety of color ring back tone music that are of the terminal device, the color ring back tone of the terminal device to the color ring back tone music corresponding to the current context includes determining, according to the correspondence, an address of color ring back tone music corresponding to a current context identifier, where the correspondence includes a context identifier and an address of color ring back tone music corresponding to the context identifier; and setting the color ring back tone of the terminal device to color ring back tone music stored in the address of the color ring back tone music.

With reference to any one of the first possible implementation manner of the first aspect to the third possible implementation manner of the first aspect, in a fourth possible implementation manner of the first aspect, the method further includes receiving context information entered by a user, where the context information is used to indicate a corresponding context; acquiring a first color ring back tone music set matching the context information entered by the user, where the first color ring back tone music set includes M pieces of color ring back tone music, and M is greater than or equal to 1; recommending N pieces of color ring back tone music in the first color ring back tone music set to the user for user selection, where N is greater than or equal to 1, and N is less than or equal to M; and storing a correspondence between color ring back tone music selected by the user and the context information entered by the user.

With reference to the fourth possible implementation manner of the first aspect, in a fifth possible implementation manner of the first aspect, the acquiring a first color ring back tone music set matching the context information entered by the user includes acquiring the first color ring back tone music set whose semantic relevancy between a label of color ring back tone music and the context information entered by the user is greater than a first preset threshold.

With reference to the fifth possible implementation manner of the first aspect, in a sixth possible implementation manner of the first aspect, the acquiring the first color ring back tone music set whose semantic relevancy between a label of color ring back tone music and the context information entered by the user is greater than a first preset threshold includes analyzing a use record of the user using a data analysis technology, so as to obtain a music type that the user is interested in, where the use record of the user includes any one or any combination of the following: a color ring back tone use record of the user and a color ring back tone music listening record of the user; and acquiring, from the music type that the user is interested in, the first color ring back tone music set whose semantic relevancy between the label of the color ring back tone music and the context information entered by the user is greater than the first preset threshold.

With reference to the fourth possible implementation manner of the first aspect or the fifth possible implementation manner of the first aspect or the sixth possible implementation manner of the first aspect, in a seventh possible implementation manner of the first aspect, the recommending N pieces of color ring back tone music in the first color ring back tone music set to the user for user selection includes sorting all color ring back tone music in the first color ring back tone music set in a descending order according to a popularity degree, and selecting and recommending the first N pieces of color ring back tone music for user selection, where the popularity degree is determined by any one or more of the following factors: a quantity of access times within a fixed period of time, a quantity of access users, and access frequency per unit time.

With reference to the first aspect, in an eighth possible implementation manner of the first aspect, before the setting a color ring back tone of the terminal device to color ring back tone music corresponding to the current context, and after the determining a current context of the terminal device according to the current value of the context parameter, the method further includes acquiring a second color ring back tone music set matching the current context, where the second color ring back tone music set includes Q pieces of color ring back tone music, and Q is greater than or equal to 1; and recommending P pieces of color ring back tone music in the second color ring back tone music set to the user for user selection, where P is greater than or equal to 1, and P is less than or equal to Q; and correspondingly, the setting a color ring back tone of the terminal device to color ring back tone music corresponding to the current context includes setting the color ring back tone of the terminal device to color ring back tone music selected by the user.

With reference to the eighth possible implementation manner of the first aspect, in a ninth possible implementation manner of the first aspect, the acquiring a second color ring back tone music set matching the current context includes acquiring the second color ring back tone music set whose semantic relevancy between a label of color ring back tone music and the current context is greater than a second preset threshold.

With reference to the ninth possible implementation manner of the first aspect, in a tenth possible implementation manner of the first aspect, the acquiring the second color ring back tone music set whose semantic relevancy between a label of color ring back tone music and the current context is greater than a second preset threshold includes analyzing a use record of the user using a data analysis technology, so as to obtain a music type that the user is interested in, where the use record of the user includes any one or any combination of the following: a color ring back tone use record of the user and a color ring back tone music listening record of the user; and acquiring, from the music type that the user is interested in, the second color ring back tone music set whose semantic relevancy between the label of the color ring back tone music and the current context is greater than the second preset threshold.

With reference to the eighth possible implementation manner of the first aspect or the ninth possible implementation manner of the first aspect or the tenth possible implementation manner of the first aspect, in an eleventh possible implementation manner of the first aspect, the recommending P pieces of color ring back tone music in the second color ring back tone music set to the user for user selection includes sorting all color ring back tone music in the second color ring back tone music set in a descending order according to a popularity degree, and selecting and recommending the first P pieces of color ring back tone music for user selection, where the popularity degree is determined by any one or more of the following factors: a quantity of access times within a fixed period of time, a quantity of access users, and access frequency per unit time.

With reference to any one of the eighth possible implementation manner of the first aspect to the eleventh possible implementation manner of the first aspect, in a twelfth possible implementation manner of the first aspect, the method further includes storing a correspondence between the color ring back tone music selected by the user and the current context, so that when the terminal device is in the current context next time, the color ring back tone is set, according to the correspondence, to the color ring back tone music that is selected by the user and that corresponds to the current context.

With reference to the first aspect or any one of the first possible implementation manners of the first aspect to the twelfth possible implementation manner of the first aspect, in a thirteenth possible implementation manner of the first aspect, the method further includes notifying the user that the color ring back tone of the terminal device is already set to the color ring back tone music corresponding to the current context.

According to a second aspect, a method for determining color ring back tone music is provided, including acquiring a current value of a context parameter of a terminal device, where the context parameter indicates a characteristic of a context in which the terminal device is applied, and the context parameter includes any one or any combination of the following: a location parameter, an activity parameter, and an environmental parameter; determining a current context of the terminal device according to the current value of the context parameter; acquiring a color ring back tone music set corresponding to the current context, where the color ring back tone music set includes one or more pieces of color ring back tone music; and providing all or some music in the color ring back tone music set for a user, so that the user determines, from the color ring back tone music set, color ring back tone music corresponding to the current context.

With reference to the second aspect, in a first possible implementation manner of the second aspect, the acquiring a color ring back tone music set corresponding to the current context includes acquiring the color ring back tone music set whose semantic relevancy between a label of color ring back tone music and the current context is greater than a preset threshold.

With reference to the first possible implementation manner of the second aspect, in a second possible implementation manner of the second aspect, the acquiring the color ring back tone music set whose semantic relevancy between a label of color ring back tone music and the current context is greater than a preset threshold includes analyzing a use record of the user using a data analysis technology, so as to obtain a music type that the user is interested in, where the use record of the user includes any one or any combination of the following: a color ring back tone use record of the user and a color ring back tone music listening record of the user; and acquiring, from the music type that the user is interested in, the color ring back tone music set whose semantic relevancy between the label of the color ring back tone music and the current context is greater than the preset threshold.

With reference to the second aspect or the first possible implementation manner of the second aspect or the second possible implementation manner of the second aspect, in a third possible implementation manner of the second aspect, the providing all or some music in the color ring back tone music set for a user, so that the user determines, from the color ring back tone music set, color ring back tone music corresponding to the current context includes sorting all U pieces of color ring back tone music in the color ring back tone music set in a descending order according to a popularity degree, and selecting the first W pieces of color ring back tone music and providing them for the user, so that the user determines, from the W pieces of color ring back tone music, the color ring back tone music corresponding to the current context, where U is greater than or equal to 1, and W is greater than or equal to 1 and less than or equal to U; the popularity degree is determined by any one or more of the following factors: a quantity of access times within a fixed period of time, a quantity of access users, and access frequency per unit time.

According to a third aspect, an apparatus for setting a color ring back tone is provided, including a context parameter acquiring unit configured to acquire a current value of a context parameter of a terminal device, where the context parameter indicates a characteristic of a context in which the terminal device is applied, and the context parameter includes any one or any combination of the following: a location parameter, an activity parameter, and an environmental parameter; a determining unit configured to determine a current context of the terminal device according to the current value that is of the context parameter and that is acquired by the acquiring unit; and a setting unit configured to set a color ring back tone of the terminal device to color ring back tone music corresponding to the current context.

With reference to the third aspect, in a first possible implementation manner of the third aspect, the setting unit is configured to set, according to a correspondence between multiple contexts and a variety of color ring back tone music that are of the terminal device, the color ring back tone of the terminal device to the color ring back tone music corresponding to the current context.

With reference to the first possible implementation manner of the third aspect, in a second possible implementation manner of the third aspect, the setting unit is configured to determine, according to the correspondence, a color ring back tone identifier corresponding to a current context identifier, where the correspondence includes a context identifier and a color ring back tone identifier corresponding to the context identifier; and set the color ring back tone of the terminal device to color ring back tone music indicated by the color ring back tone identifier.

With reference to the first possible implementation manner of the third aspect, in a third possible implementation manner of the third aspect, the setting unit is configured to determine, according to the correspondence, an address of color ring back tone music corresponding to a current context identifier, where the correspondence includes a context identifier and an address of color ring back tone music corresponding to the context identifier; and set the color ring back tone of the terminal device to color ring back tone music stored in the address of the color ring back tone music.

With reference to any one of the first possible implementation manner of the third aspect to the third possible implementation manner of the third aspect, in a fourth possible implementation manner of the third aspect, the apparatus further includes a receiving unit configured to receive context information entered by a user, where the context information is used to indicate a corresponding context; a color ring back tone music acquiring unit configured to acquire a first color ring back tone music set matching the context information entered by the user, where the first color ring back tone music set includes M pieces of color ring back tone music, and M is greater than or equal to 1; a recommending unit configured to recommend N pieces of color ring back tone music in the first color ring back tone music set to the user for user selection, where N is greater than or equal to 1, and N is less than or equal to M; and a storing unit configured to store a correspondence between color ring back tone music selected by the user and the context information entered by the user.

With reference to the fourth possible implementation manner of the third aspect, in a fifth possible implementation manner of the third aspect, the color ring back tone music acquiring unit is configured to acquire the first color ring back tone music set whose semantic relevancy between a label of color ring back tone music and the context information entered by the user is greater than a first preset threshold.

With reference to the fifth possible implementation manner of the third aspect, in a sixth possible implementation manner of the third aspect, the color ring back tone music acquiring unit is configured to analyze a use record of the user using a data analysis technology, so as to obtain a music type that the user is interested in, where the use record of the user includes any one or any combination of the following: a color ring back tone use record of the user and a color ring back tone music listening record of the user; and acquire, from the music type that the user is interested in, the first color ring back tone music set whose semantic relevancy between the label of the color ring back tone music and the context information entered by the user is greater than the first preset threshold.

With reference to the fourth possible implementation manner of the third aspect or the fifth possible implementation manner of the third aspect or the sixth possible implementation manner of the third aspect, in a seventh possible implementation manner of the third aspect, the recommending unit is configured to sort all color ring back tone music in the first color ring back tone music set in a descending order according to a popularity degree, and select and recommend the first N pieces of color ring back tone music for user selection, where the popularity degree is determined by any one or more of the following factors: a quantity of access times within a fixed period of time, a quantity of access users, and access frequency per unit time.

With reference to the third aspect, in an eighth possible implementation manner of the third aspect, the apparatus further includes a color ring back tone music acquiring unit configured to acquire a second color ring back tone music set matching the current context, where the second color ring back tone music set includes Q pieces of color ring back tone music, and Q is greater than or equal to 1; and a recommending unit configured to recommend P pieces of color ring back tone music in the second color ring back tone music set to the user for user selection, where P is greater than or equal to 1, and P is less than or equal to Q; and correspondingly, the setting unit is configured to set the color ring back tone of the terminal device to color ring back tone music selected by the user.

With reference to the eighth possible implementation manner of the third aspect, in a ninth possible implementation manner of the third aspect, the color ring back tone music acquiring unit is configured to acquire the second color ring back tone music set whose semantic relevancy between a label of color ring back tone music and the current context is greater than a second preset threshold.

With reference to the ninth possible implementation manner of the third aspect, in a tenth possible implementation manner of the third aspect, the color ring back tone music acquiring unit is configured to analyze a use record of the user using a data analysis technology, so as to obtain a music type that the user is interested in, where the use record of the user includes any one or any combination of the following: a color ring back tone use record of the user and a color ring back tone music listening record of the user; and acquire, from the music type that the user is interested in, the second color ring back tone music set whose semantic relevancy between the label of the color ring back tone music and the current context is greater than the second preset threshold.

With reference to the eighth possible implementation manner of the third aspect or the ninth possible implementation manner of the third aspect or the tenth possible implementation manner of the third aspect, in an eleventh possible implementation manner of the third aspect, the recommending unit is configured to sort all color ring back tone music in the second color ring back tone music set in a descending order according to a popularity degree, and select and recommend the first P pieces of color ring back tone music for user selection, where the popularity degree is determined by any one or more of the following factors: a quantity of access times within a fixed period of time, a quantity of access users, and access frequency per unit time.

With reference to any one of the eighth possible implementation manner of the third aspect to the eleventh possible implementation manner of the third aspect, in a twelfth possible implementation manner of the third aspect, the apparatus further includes a storing unit configured to store a correspondence between the color ring back tone music selected by the user and the current context, so that when the terminal device is in the current context next time, the color ring back tone is set, according to the correspondence, to the color ring back tone music that is selected by the user and that corresponds to the current context.

With reference to the third aspect or any one of the first possible implementation manner of the third aspect to the twelfth possible implementation manner of the third aspect, in a thirteenth possible implementation manner of the third aspect, the apparatus further includes a notifying unit configured to notify the user that the color ring back tone of the terminal device is already set to the color ring back tone music corresponding to the current context.

According to a fourth aspect, an apparatus for determining color ring back tone music is provided, including a context parameter acquiring unit configured to acquire a current value of a context parameter of a terminal device, where the context parameter indicates a characteristic of a context in which the terminal device is applied, and the context parameter includes any one or any combination of the following: a location parameter, an activity parameter, and an environmental parameter; a determining unit configured to determine a current context of the terminal device according to the current value of the context parameter; a color ring back tone music acquiring unit configured to acquire a color ring back tone music set corresponding to the current context, where the color ring back tone music set includes one or more pieces of color ring back tone music; and a providing unit configured to provide all or some music in the color ring back tone music set for a user, so that the user determines, from the color ring back tone music set, color ring back tone music corresponding to the current context.

With reference to the fourth aspect, in a first possible implementation manner of the fourth aspect, the color ring back tone music acquiring unit is configured to acquire the color ring back tone music set whose semantic relevancy between a label of color ring back tone music and the current context is greater than a preset threshold.

With reference to the first possible implementation manner of the fourth aspect, in a second possible implementation manner of the fourth aspect, the color ring back tone music acquiring unit is configured to analyze a use record of the user using a data analysis technology, so as to obtain a music type that the user is interested in, where the use record of the user includes any one or any combination of the following: a color ring back tone use record of the user and a color ring back tone music listening record of the user; and acquire, from the music type that the user is interested in, the color ring back tone music set whose semantic relevancy between the label of the color ring back tone music and the current context is greater than the preset threshold.

With reference to the fourth aspect or the first possible implementation manner of the fourth aspect or the second possible implementation manner of the fourth aspect, in a third possible implementation manner of the fourth aspect, the providing unit is configured to sort all U pieces of color ring back tone music in the color ring back tone music set in a descending order according to a popularity degree, and select the first W pieces of color ring back tone music and provide them for the user, so that the user determines, from the W pieces of color ring back tone music, the color ring back tone music corresponding to the current context, where U is greater than or equal to 1, and W is greater than or equal to 1 and less than or equal to U; the popularity degree is determined by any one or more of the following factors: a quantity of access times within a fixed period of time, a quantity of access users, and access frequency per unit time.

It can be learned that according to the method and the apparatus for setting a color ring back tone provided in the embodiments of the present disclosure, a current value of a context parameter of a terminal device is acquired, a current context of the terminal device is determined according to the current value of the context parameter, and a color ring back tone of the terminal device is set to color ring back tone music corresponding to the current context, which implements automatic setting of color ring back tone music of the terminal device according to the current context of the terminal device, and resolves a problem in the prior art that manual setting of a color ring back tone is tedious and inconvenient when a user has multiple activities or a location is frequently changed, thereby improving user experience of the terminal device.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Embodiment 1

Figure 1:
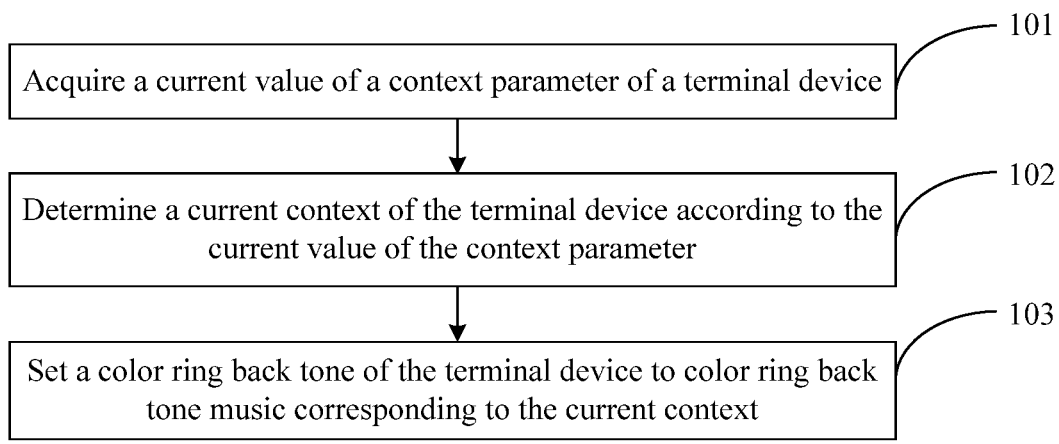
FIG. 1 is a schematic flowchart of a method for setting a color ring back tone according to an embodiment of the present disclosure.

This embodiment of the present disclosure provides a method for setting a color ring back tone, which may be applied to a terminal device, for example, a mobile phone, a tablet computer, a laptop, or a desk computer. Referring to FIG. 1, the method may include:

101. Acquire a current value of a context parameter of the terminal device.

It should be noted that a "context" described in this embodiment of the present disclosure is a "context" in the field of computer technologies. A context of an object includes information such as a location in which the object is located, an environment in which the object is located, and an activity, an action, and a status of a user involved in the object. Persons skilled in the art may understand the "context" in this embodiment of the present disclosure with reference to a definition of a context in context awareness calculation in the prior art or in context awareness calculation after the development of technologies.

The context parameter of the terminal device indicates a characteristic of a context in which the terminal device is applied, and therefore the current value of the context parameter indicates a value of a characteristic of a current context of the terminal device.

In this embodiment of the present disclosure, the context parameter may include any one or any combination of the following: a location parameter, an activity parameter, and an environmental parameter.

The location parameter is used to reflect a location or a place in which the terminal device or a holder of the terminal device is located. The location parameter may include a GPS parameter, a WiFi network parameter, a base station cell parameter of a telephone network, and the like that are of the terminal device. For specific content of the location parameter, the present disclosure sets no specific limitation. The activity parameter is used to reflect an activity situation of the terminal device or the holder of the terminal device. The activity parameter may include a speed parameter, an acceleration parameter, and the like that are of the terminal device. The activity parameter of the terminal device may reflect an activity situation of the terminal device, or may reflect an activity situation of a user holding the terminal device. Particularly, for a smartphone, an activity parameter acquired in context awareness generally reflects a current activity situation of a holder of the smartphone.

The environmental parameter is used to reflect a characteristic of an environment in which the terminal device is currently located. The environmental parameter may include sound volume, light intensity, and the like that are of an ambient environment of the terminal device.

It should be noted that persons skilled in the art may further select, according to an actual situation, another parameter to reflect the location or the place in which the terminal device or the holder of the terminal device is located, the activity situation, the environment characteristic, and the like. The foregoing description is only exemplary.

Current values of these context parameters may be acquired by means of collection using a sensor disposed on the terminal device. The sensor may be one or more detection apparatuses disposed on the terminal device, and can convert, according to a law, information obtained by sensing into an electrical signal or information in another needed form for output.

For example, a GPS location in the location parameter of the terminal device may be acquired by means of collection using a GPS sensor of the terminal device, an acceleration value in the activity parameter of the terminal device may be acquired by means of collection using an acceleration sensor of the terminal device, the sound volume of the ambient environment in the environmental parameter of the terminal device may be acquired by means of collection using a sound sensor of the terminal device, the light intensity of the ambient environment in the environmental parameter of the terminal device may be acquired by means of collection using an ambient light sensor of the terminal device.

102. Determine a current context of the terminal device according to the current value of the context parameter.

Implementation of this step may be completed by means of automatic determining using a predictive perception model. The predictive perception model is generated by the terminal device by collecting and using basic data of multiple test user groups as sample data and then performing model training of a machine learning algorithm, and is used to determine the current context of the terminal device according to the current value of the context parameter.

It should be noted that there is a state in which the terminal device is cold booted, that is, the terminal device is rebooted from a power-off state, all stored data is lost, and hardware is re-detected and an operating system is booted. If a system of the terminal device is cold booted, no enough data can be used to perform cluster analysis. Therefore, it is possible that the predictive perception model cannot be used for automatic determining.

Therefore, if the system of the terminal device is cold booted, for determining of the current context of the terminal device, a method of presetting a rule may be used to determine the current context of the terminal device.

A time rule is preset when time is within an interval from 9 o'clock in the morning to 18 o'clock in the afternoon, a current location corresponding to the terminal device is in the office; when time is within an interval from 20 o'clock in the evening to 7 o'clock in the morning next day, a current location corresponding to the terminal device is at home. In this way, when the terminal device is cold booted, for the determining of the current context of the terminal device, the foregoing preset time rule may be used, and a current location of the terminal device is preliminarily determined according to current time. If the current time is within the interval from 9 o'clock in the morning to 18 o'clock in the afternoon, it is preliminarily determined that the current location of the terminal device is in the office; if the current time is within the interval from 20 o'clock in the evening to 7 o'clock in the morning next day, it is preliminarily determined that the current location of the terminal device is at home.

It should be noted that the foregoing preset time rule used when the terminal device is cold booted only illustrates, in an exemplary form, a manner of how to determine the current context of the terminal device when the terminal device is cold booted. In an actual application, a preset rule that is used to determine the current context of the terminal device and that is used when the terminal device is cold booted may use the preset time rule, may use a preset location rule or another preset rule, or may use a comprehensive decision method of any one of the foregoing rules. A type and content of a specific rule used when the terminal device is cold booted may be set according to an actual need. All embodiments of the present disclosure set no limitation thereto.

It can be understood that in addition to the foregoing methods, in this embodiment of the present disclosure, the current context of the terminal device may also be determined using any method used in an existing context awareness technology, and details are not described in this embodiment of the present disclosure.

Exemplarily, this embodiment of the present disclosure provides a specific context determining method, where a context parameter used in the method includes a location parameter, an activity parameter, and an environmental parameter. A current location in which the terminal device is located is determined according to a current value of the location parameter, a current activity of a user corresponding to the terminal device is determined according to a current value of the activity parameter and a current value of the environmental parameter, and the current context of the terminal device is determined according to the current location and the current activity.

The current location of the terminal device may be acquired by means of cluster analysis and according to the current value of the location parameter of the terminal device, the current activity of the terminal device may be acquired using a decision tree model and according to the current value of the activity parameter and the current value of the environmental parameter that are of the terminal device, and then the current context of the terminal device is determined according to the current location and the current activity that are of the terminal device.

The current location of the terminal device is determined using a K-Means cluster analysis algorithm and according to the current value of the location parameter of the terminal device and a preset predictive perception model. Certainly, the current location of the terminal device may also be acquired using another cluster analysis method. All the embodiments of the present disclosure set no specific limitation on a clustering method in which a current place of the terminal device is determined according to the location parameter of the terminal device.

Exemplarily, the current value of the activity parameter of the terminal device is acquired, it is determined, according to the current value of the activity parameter, that the terminal device turns from face-up to back-up within a short period of time, and it is determined, using the current value that is of the environmental parameter and that is acquired by the sound sensor of the terminal device, that there are people who constantly talk and do not make noise in the ambient environment of the terminal device. Therefore, it is predicted that the terminal device is currently in a "conference" state. Further, it is determined, using the acquired current value of the location parameter of the terminal device, that the terminal device is currently in a "conference room" or an "office location", and then it is determined that the current context of the terminal device is "attending a conference in the conference room".

Exemplarily, current values of the WiFi network parameter, the GPS parameter, and the base station cell Cell parameter that are in the location parameter of the terminal device are acquired, cluster analysis of a location is performed using the K-Means cluster analysis algorithm, and it is predicted that the current location of the terminal device is at home. Further, the current value of the environmental parameter of the terminal device is acquired using the sound sensor of the terminal device, and it is predicted that the ambient environment of the terminal device is quiet. Moreover, a current acceleration value in the activity parameter of the terminal device is acquired using the acceleration sensor of the terminal device, and it is determined, according to the current acceleration value, that the terminal device is currently static for a long period of time. Moreover, the current value of the environmental parameter of the terminal device is acquired using the ambient light sensor of the terminal device, it is predicted that current light intensity of the ambient environment of the terminal device is extremely low, and then it is determined that the current context of the terminal device is "already falling asleep", which generally indicates that a current holder of the terminal device is already in a sleep state.

Exemplarily, the current acceleration value in the activity parameter of the terminal device is acquired, it is determined that the current acceleration value is a speed of an automobile, and then it is predicted that a user currently holding the terminal device is driving or riding. Further, the current value of the environmental parameter of the terminal device is acquired using the sound sensor of the terminal device, it is determined, according to the current value of the environmental parameter, that the ambient environment is quiet, and then it is determined that the current context of the terminal device is "driving", which generally indicates that the current holder of the terminal device is driving unless the terminal device itself has a driving function.

It should be noted that the acceleration value that is in the activity parameter of the terminal device and that is acquired by means of collection using the acceleration sensor may be used as a reference for determining the current activity of the terminal device. A correspondence between the acceleration value and an activity of the terminal device is not limited in the present disclosure, and may be determined according to an actual need.

It should be noted that the current location of the terminal device is determined according to the current value of the location parameter of the terminal device, the current activity of the terminal device is determined according to the current value of the activity parameter and the current value of the environmental parameter that are of the terminal device, and the current context of the terminal device is determined according to the current location and the current activity that are of the terminal device. All these specific processes may be completed by the predictive perception model.

The foregoing examples are only exemplary description for determining, and the present disclosure sets no specific limitation on a determining process. Certainly, any context determining method in the prior art may also be used, and persons skilled in the art may select the method according to an actual need.

It can be understood that in some cases, a single parameter can accurately indicate the context of the terminal device. For example, when a current speed of the terminal device is greater than 700 kilometers/hour, it can be determined that the terminal device or the current holder of the terminal device is taking a plane (a speed of a means of transportation on land generally cannot reach this value). However, in most cases, multiple parameters are needed to jointly determine the context of the terminal device. For example, a current activity of the holder of the terminal device is determined according to the environmental parameter and the activity parameter, or the current context of the terminal device is jointly determined according to the environmental parameter, the activity parameter, the location parameter, and another parameter. All these cases may appear in the context awareness calculation in the prior art, and the foregoing manner in which the context is determined according to the three parameters is only exemplary. Persons skilled in the art can easily figure out another context determining method according to a context awareness calculation technology and the technical solutions disclosed in the present disclosure.

103. Set a color ring back tone of the terminal device to color ring back tone music corresponding to the current context.

In an implementation manner, a correspondence between multiple contexts and a variety of color ring back tone music that are of the terminal device is stored in the terminal device, and the color ring back tone of the terminal device is set, according to the correspondence that is between the multiple contexts and the variety of color ring back tone music and that is stored in the terminal device, to the color ring back tone music corresponding to the current context.

The correspondence between the multiple contexts and the variety of color ring back tone music that are of the terminal device includes the multiple contexts and a variety of color ring back tone music corresponding to the contexts. The correspondence may be set by a user using the terminal device, or may be set by the terminal device by default, or may be determined by the user of the terminal device after initial determining by the terminal device; or another implementation manner is used. This embodiment of the present disclosure sets no limitation thereto. It should be noted that when the correspondence is set by the terminal device by default, specific content of the correspondence may be set according to a customary rule. The present disclosure sets no limitation thereto. For example, a conference context corresponds to color ring back tone music whose music title includes "conference".

Optionally, in the correspondence, a context identifier and a color ring back tone identifier corresponding to the context identifier may be stored, and the context identifier and an address of color ring back tone music corresponding to the context identifier may also be stored. The present disclosure sets no specific limitation on a context and a type of color ring back tone music that are stored in the correspondence, which may be determined according to an actual need.

The context identifier is information that can uniquely identify the context, and may include any one of the following identifiers: a context name, a context label, a context code, and the like. The present disclosure sets no specific limitation thereto.

The color ring back tone identifier is information that can uniquely identify the color ring back tone, and may include any one of the following identifiers: a color ring back tone name, a color ring back tone label, a color ring back tone code, and the like. The present disclosure sets no specific limitation thereto.

The address of the color ring back tone music may include a website address or a link address of the color ring back tone music. The present disclosure sets no specific limitation thereto.

Optionally, according to a difference in the context and the type of color ring back tone music that are stored in the correspondence, that the color ring back tone of the terminal device is set, according to the correspondence between the multiple contexts and the variety of color ring back tone music that are of the terminal device, to the color ring back tone music corresponding to the current context may at least include either of the following two manners.

A first manner: when the correspondence includes the context identifier and the color ring back tone identifier corresponding to the context identifier, a color ring back tone identifier corresponding to a current context identifier is determined according to the correspondence; and the color ring back tone of the terminal device is set to color ring back tone music indicated by the color ring back tone identifier.

A second manner: when the correspondence includes the context identifier and the address of the color ring back tone music corresponding to the context identifier, an address of color ring back tone music corresponding to a current context identifier is determined according to the correspondence; and the color ring back tone of the terminal device is set to color ring back tone music stored in the address of the color ring back tone music.

Exemplarily, the correspondence may be stored in the terminal device in a table form (as shown in Table 1), and certainly, may also be stored in another form. The present disclosure sets no limitation on a form of the correspondence.

When the correspondence exists in the table form, Table 1 is queried according to the current context of the terminal device, and the color ring back tone is set to the color ring back tone music corresponding to the current context.

A context that is the same as or similar to the current context is first obtained by searching Table 1, and then color ring back tone music corresponding to the context is found. Then, the color ring back tone of the terminal device is set to the color ring back tone music corresponding to the current context in the correspondence.

TABLE 1

| Context | Color ring back tone music |
|---|---|
| Working in the office | Corporation slogan |
| Resting at home | Music 1 |
| Driving | Music 2 |
| Attending a conference in a conference room | "Being in a conference, contact later" |
| ... | ... |

It is worth noting that the value that is of the current context and that is determined according to the foregoing step may not be completely consistent with a value in Table 1, for example, "attending a conference in an office area" and "attending a conference in a conference room". In this case, matching may be performed on the two values using a semantic similarity matching algorithm to find a context most similar to the current context. The semantic similarity matching algorithm is a method in the prior art, and details are not described in this embodiment of the present disclosure. In another case, if Table 1 is generated according to a result of historical context calculation of the terminal device, the value that is of the current context and that is determined according to the foregoing step may generally be completely consistent with a value of a context in Table 1. In this case, a context that is the same as the current context only needs to be obtained by searching.

Exemplarily, if it is determined, according to the current value of the context parameter of the terminal device, that the current context of the terminal device is "working in the office", the color ring back tone of the terminal device may be set to a corporation slogan according to the correspondence shown in Table 1. This embodiment of the present disclosure sets no limitation on specific content of the corporation slogan. If it is determined, according to the current value of the context parameter of the terminal device, that the current context of the terminal device is "driving", the color ring back tone of the terminal device may be set to music 2 according to the correspondence shown in Table 1, where the music 2 may be music whose semantic relevancy is relatively close to that of "driving", for example, "Cowboy on the Run". A music label of the music may be "on the run", which relatively conforms to a state of the terminal holder when the terminal holder is driving.

Further, when the correspondence is set by the user using the terminal device, the method provided in this embodiment of the present disclosure may further include:

First, context information entered by the user is received. The context information is used to indicate a corresponding context, for example, a context name, and characteristic information identifying the context. That the user enters the context information may include any one of the following situations:

1. When using the terminal device, the user actively enters the context information to set the correspondence. For the terminal device, the context information actively entered by the user is received. The context information actively entered by the user may include context information entered by the user at any time, or the user enters the context information when getting into a context. The present disclosure sets no specific limitation thereto. For example, when using the terminal device for the first time, the user expects that the color ring back tone music of the terminal device may more conform to characteristics of different contexts in which the user is located, and therefore, actively enters one or more pieces of context information to set a correspondence between the context information and the color ring back tone music in the terminal device, for example, "resting at home", "working in the office", and "driving".

2. The user enters the context information on the recommendation of the terminal device. For the terminal device, before receiving the context information entered by the user, the terminal device recommends one or more pieces of context information to the user for user selection, and then receives context information selected by the user and uses the received context information as the context information entered by the user. For example, after the terminal device or the user of the terminal device goes back home, the terminal device actively acquires the context parameter, determines, by means of context awareness, that the current context is "home", and then recommends the current context of "own home" or "parents' home" for user selection. In this case, the user may select and enter the context information according to an actual situation.

Then, a first color ring back tone music set matching the context information entered by the user is acquired, where the first color ring back tone music set includes M pieces of color ring back tone music, and M is greater than or equal to 1. Preferably, that a first color ring back tone music set matching the context information entered by the user is acquired may be implemented as follows: the first color ring back tone music set whose semantic relevancy between a label of color ring back tone music and the context information entered by the user is greater than a first preset threshold is acquired. Further, that the first color ring back tone music set whose semantic relevancy between a label of color ring back tone music and the context information entered by the user is greater than a first preset threshold is acquired may include: analyzing a use record of the user using a data analysis technology, so as to obtain a music type that the user is interested in, where the use record of the user includes any one or any combination of the following: a color ring back tone use record of the user and a color ring back tone music listening record of the user; and acquiring, from the music type that the user is interested in, the first color ring back tone music set whose semantic relevancy between the label of the color ring back tone music and the context information entered by the user is greater than the first preset threshold.

The label of the color ring back tone music indicates a characteristic of the color ring back tone music, and may include information such as a song name, a singer, an album name, an age, a song style, a type, and a remark that are of the color ring back tone music. The present disclosure sets no limitation on specific content of the label of the color ring back tone music. The semantic relevancy in this embodiment of the present disclosure refers to a relevance degree between two words in a corpus in one or more dimensions, where the dimensions may include a word meaning, a word style, a part of speech, and the like. For example, if the context information entered by the user is "at home", semantic relevancy determining may be performed in the corpus, it is calculated that a semantic similarity between "home" and "romance" is 0.822 in terms of the word style, and it is calculated that a semantic similarity between "home" and "inspiration" is 0.48 in terms of the word style.

It should be noted that the corpus may be selected according to an actual need. Currently, some online corpora may be selected, and the corpus may also be collected and established on the terminal device. The present disclosure sets no limitation thereto. A solution in the prior art may be used to collect and establish the corpus, and details are not described in this embodiment of the present disclosure. A specific value of the first preset threshold may also be set according to an actual situation, and for example, is set to 0.5, 0.8, or the like. The present disclosure sets no specific limitation thereto.

The data analysis technology may include a related technology, such as a data mining technology, and the present disclosure sets no specific limitation thereto.

It should be noted that the first color ring back tone music set may be selected from all or some music in a music library, where the music library may be a color ring back tone music website disclosed by a network operator, or may be another music website. The present disclosure sets no specific limitation thereto. It should further be noted that a quantity M of color ring back tone music included in the first color ring back tone music set may be preset, or may not be preset. All acquired music matched with the context is added to the first color ring back tone music set.

After the first color ring back tone music set is acquired, N pieces of color ring back tone music in the first color ring back tone music set are recommended to the user for user selection, where N is greater than or equal to 1, and N is less than or equal to M. Specifically, the N pieces of color ring back tone music in the first color ring back tone music set are displayed to the user for user selection.

It should be noted that a value of N may be selected according to an actual need. All music in the first color ring back tone music set may be selected to be displayed to the user, or some music may be displayed to the user. When some music is displayed to the user, it may be random or selective, and the present disclosure sets no specific limitation thereto.

Optionally, that N pieces of color ring back tone music in the first color ring back tone music set are recommended to the user for user selection may include sorting all color ring back tone music in the first color ring back tone music set in a descending order according to a popularity degree, and selecting and recommending the first N pieces of color ring back tone music for user selection. The popularity degree is determined by any one or more of the following factors: a quantity of access times within a fixed period of time, a quantity of access users, and access frequency per unit time.

It should be noted that a "fixed period of time" that is set to acquire the popularity degree of the color ring back tone music may be determined according to an actual need, for example, time of one month or one week. When the popularity degree is determined by multiple factors, a period of time for acquiring each factor is preferably the same, or may be set to be different according to an actual need. In addition, the unit time may also be determined according to an actual need, for example, a quantity of access times/day.

When the popularity degree is determined by the multiple factors, the popularity degree may be obtained in a comprehensive manner by setting different weight values for the multiple factors, or by taking an average weight, or using another calculation manner. Exemplarily, the popularity degree is jointly determined by a quantity u of access times within a fixed period of time, a quantity w of access users, and access frequency p per unit time, and then a popularity degree Y may be calculated using the following formula: $u*a+w*b+p*c=Y$, where a, b, and c are respectively weights of u, w, and p. For example, a quantity of access times of a piece of color ring back tone music is 3000 within one month, a quantity of access users is 2000, and access frequency is 100 times/day (counting one month as 30 days); a, b, and c are respectively set to 0.3, 0.4, and 0.3, and then the popularity degree $Y=3000*0.3+2000*0.4+100*0.3=1730$. Popularity degrees of multiple pieces of music are calculated in this manner, and then all or the first several pieces of music are recommended to the user after the popularity degrees of the multiple pieces of music are sorted in a descending order.

It should be noted that the foregoing manner of calculating the popularity degree is only exemplary, and this embodiment of the present disclosure is not limited thereto.

The user generally selects color ring back tone music most matched with the current context. After the user selects the color ring back tone music most matched with the current context, a correspondence between the color ring back tone music selected by the user and the context information entered by the user is stored.

Then, a process in which the correspondence is set by the user using the terminal device is completed.

It should be noted that the process of setting the correspondence may occur at any time in a process in which the user uses the terminal device, and there is no necessary order relationship with the method for setting a color ring back tone provided above in this embodiment. For example, the user may add context information at any time.

In another implementation manner, the terminal device may acquire, in real time, the color ring back tone music matched with the current context, and provides the color ring back tone music for the user, so that the user selects, from the color ring back tone music, the color ring back tone music most matched with the current context. Specifically, after the foregoing step 102, and before step 103, the method for setting a color ring back tone provided in this embodiment of the present disclosure may further include acquiring a second color ring back tone music set matching the current context, where the second color ring back tone music set includes Q pieces of color ring back tone music, and Q is greater than or equal to 1. Q may be determined according to an actual need, and the present disclosure sets no specific limitation thereto. The acquiring a second color ring back tone music set matching the current context may include acquiring the second color ring back tone music set whose semantic relevancy between a label of color ring back tone music and the current context is greater than a second preset threshold. The second preset threshold may be determined according to an actual need, and the present disclosure sets no specific limitation thereto. Further, the acquiring the second color ring back tone music set whose semantic relevancy between a label of color ring back tone music and the current context is greater than a second preset threshold may include: analyzing a use record of the user using a data analysis technology, so as to obtain a music type that the user is interested in, where the use record of the user includes any one or any combination of the following: a color ring back tone use record of the user and a color ring back tone music listening record of the user; and acquiring, from the music type that the user is interested in, the second color ring back tone music set whose semantic relevancy between the label of the color ring back tone music and the current context is greater than the second preset threshold.

The music type that the user is interested in may be acquired in the following manner: one or more music types most used by the user are acquired according to the color ring back tone music use record of the user and a music type of each piece of color ring back tone music; or one or more music types most listened by the user are acquired according to the color ring back tone music listening record of the user and a music type of each piece of color ring back tone music; or one or more music types most used and most listened by the user are acquired by comprehensively considering a color ring back tone music use record and the color ring back tone music listening record. There are multiple implementation manners, which are not enumerated in this embodiment of the present disclosure. Persons skilled in the art can easily figure out another implementation manner according to the method provided in this embodiment of the present disclosure.

P pieces of color ring back tone music in the second color ring back tone music set are recommended to the user for user selection, where P is greater than or equal to 1, and P is less than or equal to Q. P may be determined according to an actual need, and the present disclosure sets no specific limitation thereto.

Preferably, that P pieces of color ring back tone music in the second color ring back tone music set are recommended to the user for user selection may include: sorting all color ring back tone music in the second color ring back tone music set in a descending order according to a popularity degree, and selecting and recommending the first P pieces of color ring back tone music for user selection, where the popularity degree is determined by any one or more of the following factors: a quantity of access times within a fixed period of time, a quantity of access users, and access frequency per unit time.

Correspondingly, step 103 of setting a color ring back tone of the terminal device to color ring back tone music corresponding to the current context may include: setting the color ring back tone of the terminal device to the color ring back tone music selected by the user. The color ring back tone music selected by the user refers to color ring back tone music selected by the user from the second color ring back tone music set.

In the implementation method, further, the method may further include storing a correspondence between the color ring back tone music selected by the user and the current context, so that when the terminal device is in the current context next time, the color ring back tone is set, according to the correspondence, to the color ring back tone music that is selected by the user and that corresponds to the current context.

After the color ring back tone is set or modified according to the method provided in this embodiment of the present disclosure, the user may further be notified in time. Therefore, further, after step 103, the method may further include notifying the user that the color ring back tone of the terminal device is already set to the color ring back tone music corresponding to the current context. For example, when the color ring back tone of the terminal device is set to a phrase "corporation slogan", the user may be prompted in a message notifying manner, "you are already in the office, and a current color ring back tone is already set to a 'corporation slogan'" is displayed in the terminal device, and the user is notified in time that the color ring back tone of the terminal device is already changed, so that the user may choose to accept or change a color ring back tone setting after learning that the color ring back tone of the terminal device is already changed.

It should be noted that the foregoing example only illustrates, in a message notifying form, how to set the color ring back tone of the terminal device to the color ring back tone music corresponding to the current context. A form and content of a notification may be determined according to an actual need, and this embodiment of the present disclosure sets no limitation thereto.

It should be noted that this embodiment of the present disclosure describes the method for setting a color ring back tone, but the protection scope of the present disclosure is not limited thereto. Any variation or replacement readily figured out by persons skilled in the art within the technical scope disclosed in the present disclosure shall fall within the protection scope of the present disclosure.

It can be learned that according to the method for setting a color ring back tone provided in this embodiment of the present disclosure, a current value of a context parameter of a terminal device is acquired, a current context of the terminal device is determined according to the current value of the context parameter, and a color ring back tone of the terminal device is set to color ring back tone music corresponding to the current context, which implements automatic setting of color ring back tone music of the terminal device according to the current context of the terminal device, and resolves a problem in the prior art that manual setting of a color ring back tone is tedious and inconvenient when a user has multiple activities or a location is frequently changed, thereby improving user experience of the terminal device.

Further, efficiency of dynamically setting color ring back tone music is improved by pre-storing, in the terminal device, a correspondence between a context and the color ring back tone music. Alternatively, in a manner in which the color ring back tone music is instantly acquired and dynamically set instantly according to a user selection, a problem of an incomprehensive correspondence may be resolved to a certain extent, and a new correspondence may be stored in time, which ensures efficiency of dynamically setting the color ring back tone music when a same context is encountered next time.

Further, when color ring back tone music matched with the current context is acquired, the color ring back tone music may be selected, with reference to a use record of the user, as far as possible from a music type that the user is interested in, which increases a success rate of setting the color ring back tone music, and further improves the user experience of the terminal device.

Embodiment 2

Figure 2:
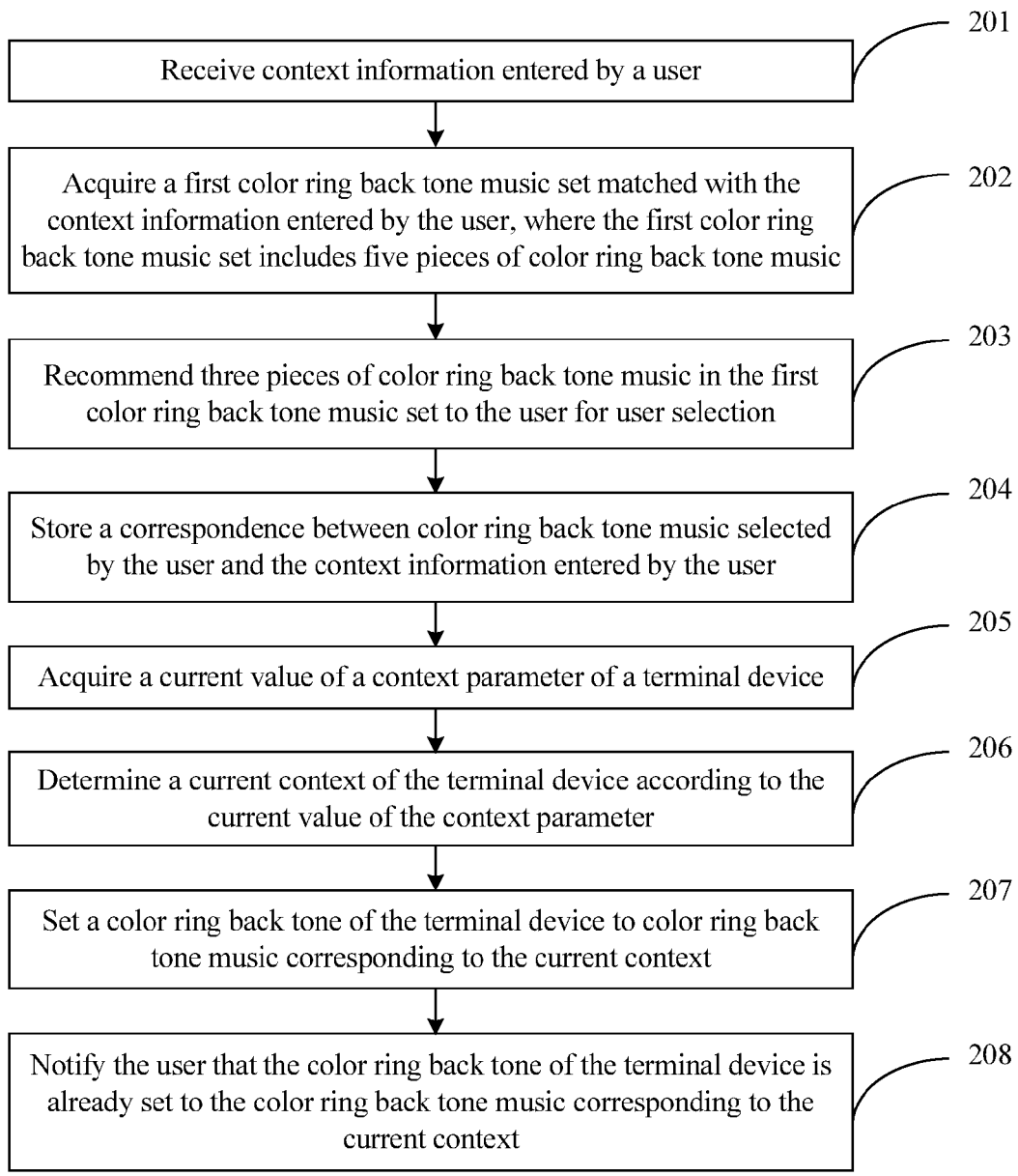
FIG. 2 is a schematic flowchart of another method for setting a color ring back tone according to an embodiment of the present disclosure.

Embodiment 2 of the present disclosure provides a method for setting a color ring back tone, and exemplarily describes a specific implementation process of the method for setting a color ring back tone in FIG. 1. Referring to FIG. 2, the method may include:

201. Receive context information entered by a user.

It is assumed that a user A uses a terminal device to set a correspondence between a context and a color ring back tone that conform to a preference of the user A. For example, a context "sleeping at home" entered by the user A is received.

202. Acquire a first color ring back tone music set matching the context information entered by the user, where the first color ring back tone music set includes five pieces of color ring back tone music. For example, a first color ring back tone music set whose semantic relevancy between a label of color ring back tone music and home is greater than a preset threshold 0.7 is acquired according to the context "sleeping at home" entered by the user A. By means of calculation in a corpus, semantic relevancy between "home and sleep" and "romance and quietness" is 0.822, which is greater than the preset threshold 0.7; music whose music label is "romance and quietness" is selected from a music library; the first color ring back tone music set, including "Lullaby", "A Comme Amour", "Dream Catcher", "Childhood Memories", and "Half Moon Serenade", is then acquired according to a use record of the user A.

203. Recommend three pieces of color ring back tone music in the first color ring back tone music set to the user for user selection. For example, the five pieces of color ring back tone music in the first color ring back tone music set are sorted in a descending order according to a popularity degree as follows: "Half Moon Serenade", "Childhood Memories", "A Comme Amour", "Dream Catcher", and "Lullaby"; after the sorting, the first three pieces of color ring back tone music "Half Moon Serenade", "Childhood Memories", and "A Comme Amour" are recommended to the user using a screen of a terminal device for user selection.

204. Store a correspondence between color ring back tone music selected by the user and the context information entered by the user.

It is assumed that color ring back tone music selected by the user from the first color ring back tone music set is "Childhood Memories", and then a correspondence between "Childhood Memories" and the context "sleeping at home" is stored.

It should be noted that step 201 to step 204 only illustrate, in an exemplary form, a process of generating a correspondence. The user may enter multiple contexts and store correspondences of the multiple contexts. An implementation process is the same as step 201 to step 204, and details are not described herein again.

205. Acquire a current value of a context parameter of the terminal device.

It is assumed that a GPS parameter location of the context parameter of the terminal device is acquired, it is learned, using a sound sensor of the terminal device, that a current value of an environmental parameter of the terminal device is quiet, and it is learned, using an acceleration sensor of the terminal device, that an acceleration in an activity parameter of the terminal device is extremely small.

206. Determine a current context of the terminal device according to the current value of the context parameter.

For example, a location in which home of the user A is located is determined according to the GPS parameter location of the context parameter of the terminal device; according to that the current value of the environmental parameter of the terminal device is quiet and that the acceleration in the activity parameter of the terminal device is extremely small, it is determined that the user A does not move. Therefore, it is determined that the user A is sleeping at home.

207. Set a color ring back tone of the terminal device to color ring back tone music corresponding to the current context.

For example, the color ring back tone of the terminal device is set to color ring back tone music "Childhood Memories" corresponding to the current context "sleeping at home".

208. Notify the user that the color ring back tone of the terminal device is already set to the color ring back tone music corresponding to the current context.

For example, "you are sleeping at home, and a current color ring back tone is already set to 'Childhood Memories'" is displayed on the screen of the terminal device, so that the user may choose to accept or change a color ring back tone setting after learning "you are sleeping at home, and a current color ring back tone is already set to 'Childhood Memories'".

It can be learned that according to the method for setting a color ring back tone provided in this embodiment of the present disclosure, a correspondence between a context and color ring back tone music may be stored according to a user setting, then color ring back tone music corresponding to the context is acquired in time from the correspondence when a same context is encountered next time, and a color ring back tone is dynamically set, thereby improving efficiency of dynamically setting color ring back tone music of a terminal device, and improving user experience.

Embodiment 3

Figure 3:
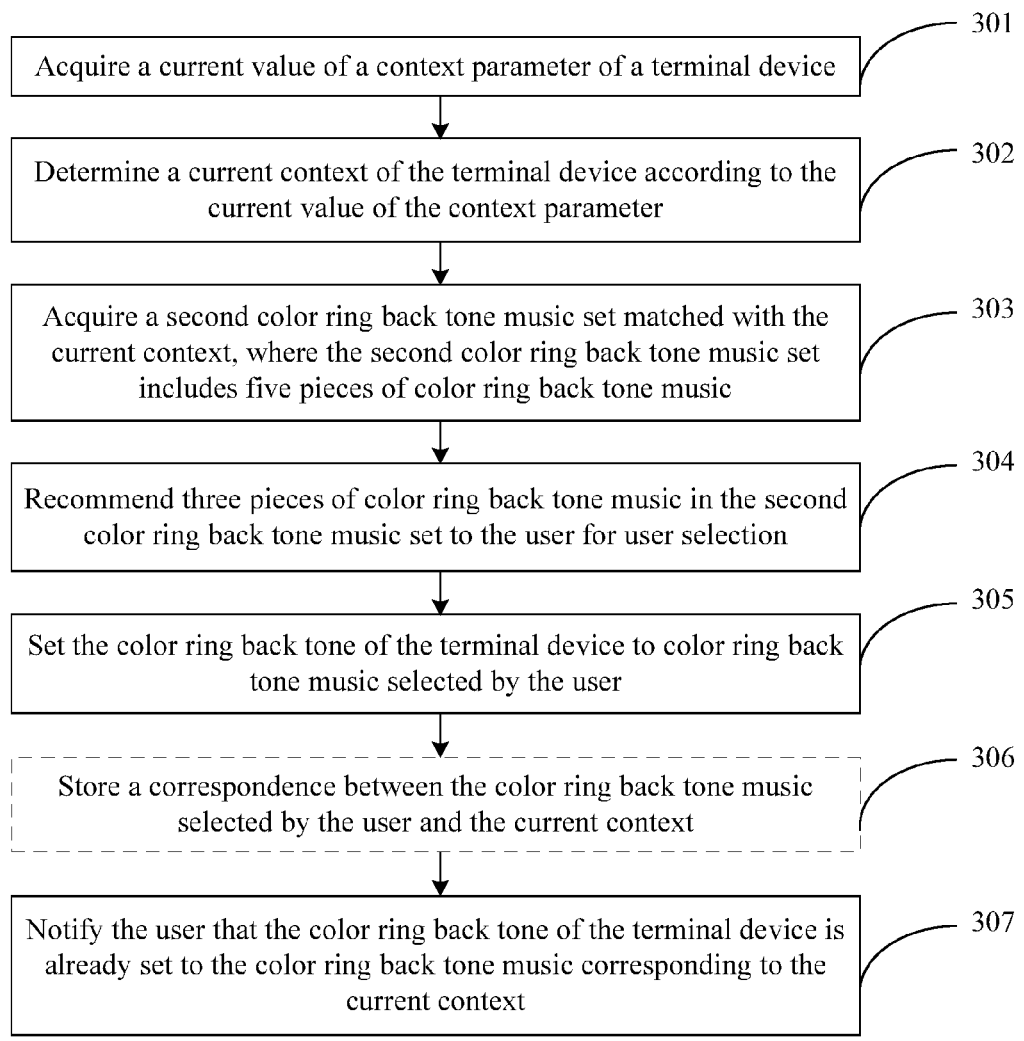
FIG. 3 is a schematic flowchart of still another method for setting a color ring back tone according to an embodiment of the present disclosure.

Embodiment 3 of the present disclosure provides still another method for setting a color ring back tone, and exemplarily describes a specific implementation process of the method for setting a color ring back tone in FIG. 1. A difference between this embodiment and Embodiment 2 is that when a color ring back tone of a terminal device is set, manners of selecting color ring back tone music are different. Referring to FIG. 3, the method may include:

301. Acquire a current value of a context parameter of the terminal device.

It is assumed that a GPS parameter location of the context parameter of the terminal device is acquired, it is learned, using a sound sensor of the terminal device, that a current value of an environmental parameter of the terminal device is quiet, and it is learned, using an acceleration sensor of the terminal device, that an acceleration in an activity parameter of the terminal device is extremely small.

302. Determine a current context of the terminal device according to the current value of the context parameter.

For example, a location in which home of a user A is located is determined according to the GPS parameter location of the context parameter of the terminal device; according to that the current value of the environmental parameter of the terminal device is quiet and that the acceleration in the activity parameter of the terminal device is extremely small, it is determined that the user A does not move. Therefore, it is determined that the user A is sleeping at home.

303. Acquire a second color ring back tone music set matching the current context, where the second color ring back tone music set includes five pieces of color ring back tone music.

For example, a second color ring back tone music set whose semantic relevancy between a label of color ring back tone music and home is greater than a preset threshold 0.7 is acquired according to a context "sleeping at home" entered by the user A.

By means of calculation in a corpus, semantic relevancy between "home and sleep" and "romance and quietness" is 0.822, which is greater than the preset threshold 0.7.

Music whose music label is "romance and quietness" is selected from a music library; a first music set, including "Lullaby", "A Comme Amour", "Dream Catcher", "Childhood Memories", and "Half Moon Serenade", is then acquired according to a use record of the user A.

It is easily figured out that before step 303, the method may further include providing, for the user, the current context of the terminal device determined in step 302, so that the user selects a context most conforming to an actual situation. Then, a second color ring back tone music set that is matched with the context selected by the user is acquired in step 303. In this way, accuracy of context determining may be effectively ensured.

304. Recommend three pieces of color ring back tone music in the second color ring back tone music set to the user for user selection.

For example, the five pieces of color ring back tone music in the second color ring back tone music set are sorted in a descending order according to a popularity degree as follows: "Half Moon Serenade", "Childhood Memories", "A Comme Amour", "Dream Catcher", and "Lullaby"; after the sorting, the first three pieces of color ring back tone music "Half Moon Serenade", "Childhood Memories", and "A Comme Amour" are recommended to the user using a screen of the terminal device for user selection.

305. Set the color ring back tone of the terminal device to color ring back tone music selected by the user.

It is assumed that the color ring back tone music selected by the user from the second color ring back tone music set is "Childhood Memories", the color ring back tone of the terminal device is set to the color ring back tone music "Childhood Memories" selected by the user.

306. Store a correspondence between the color ring back tone music selected by the user and the current context.

For example, a correspondence between "Childhood Memories" and the context "sleeping at hone" is stored, so that when the terminal device is in the current context next time, the color ring back tone is set, according to the correspondence, to the color ring back tone music that is selected by the user and that corresponds to the current context. Certainly, the correspondence may also not be stored, and a manner of instant acquisition is still used when a same context is encountered next time.

307. Notify the user that the color ring back tone of the terminal device is already set to the color ring back tone music corresponding to the current context.

For example, "you are sleeping at home, and a current color ring back tone is already set to 'Childhood Memories'" is displayed on the screen of the terminal device, so that the user may choose to accept or change a color ring back tone setting after learning "you are sleeping at home, and a current color ring back tone is already set to 'Childhood Memories'".

It can be learned that according to the method for setting a color ring back tone provided in this embodiment of the present disclosure, when a terminal device is in a context for a first time, a manner of instantly acquiring and dynamically setting color ring back tone music is used, and then a result of the setting is stored, so that when the terminal device is in a same context next time, the color ring back tone music may be rapidly set using historical information, which ensures accuracy and also increases a setting speed.

Embodiment 4

Figure 4:
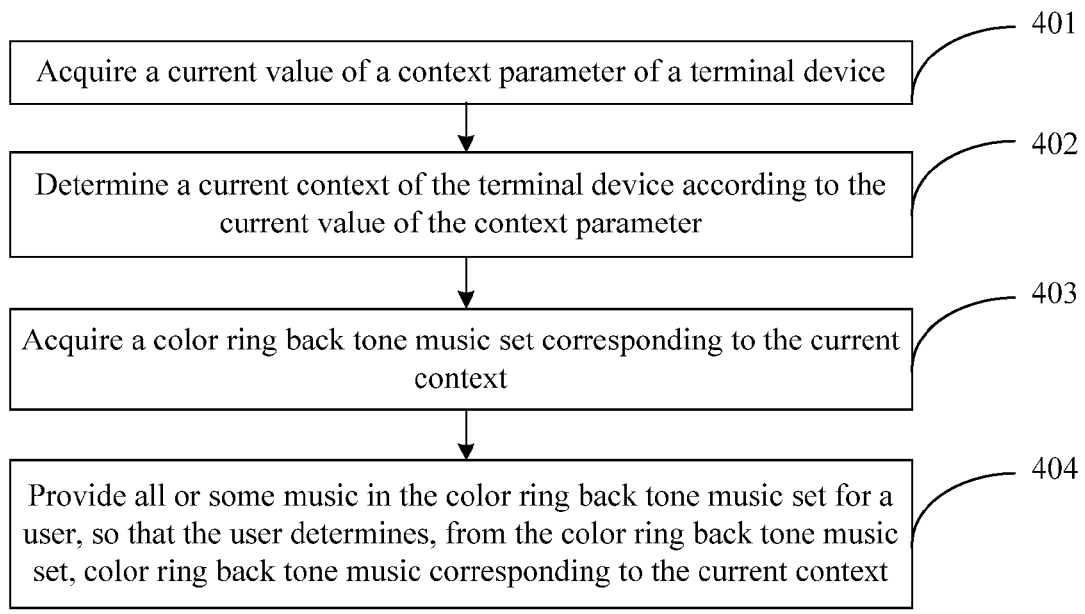
FIG. 4 is a schematic flowchart of a method for determining color ring back tone music according to an embodiment of the present disclosure.

Embodiment 4 of the present disclosure further provides a method for determining color ring back tone music. Referring to FIG. 4, the method may include:

401. Acquire a current value of a context parameter of a terminal device.

The context parameter may include any one or more of the following: a location parameter, an activity parameter, and an environmental parameter.

The location parameter may include but is not limited to a GPS parameter, a WiFi network parameter, a base station cell parameter of a telephone network, and the like that are of the terminal device. For specific content of the location parameter, the present disclosure sets no specific limitation.

The activity parameter may include but is not limited to an acceleration parameter and the like of the terminal device. For specific content of the activity parameter, the present disclosure sets no specific limitation.

The environmental parameter may include but is not limited to sound volume, light intensity, and the like that are of an ambient environment of the terminal device. For specific content of the environmental parameter, the present disclosure sets no specific limitation.

The acquiring a current value of a context parameter of a terminal device may be collecting the context parameter of the terminal device using a sensor of the terminal device. The sensor of the terminal device may be multiple detection apparatuses in the terminal device, and can convert, according to a law, information obtained by sensing into an electrical signal or information in another needed form for output.

For example, a GPS parameter in the location parameter of the terminal device may be acquired using a GPS sensor of the terminal device, an acceleration value in the activity parameter of the terminal device may be acquired using an acceleration sensor of the terminal device, the sound volume of the ambient environment of the terminal device may be collected using a sound sensor of the terminal device, the light intensity of the ambient environment of the terminal device may be collected using an ambient light sensor of the terminal device.

402. Determine a current context of the terminal device according to the current value of the context parameter.

Further, when the context parameter includes the location parameter, the activity parameter, and the environmental parameter, the determining a current context of the terminal device according to the current value of the context parameter may include: determining, according to a current value of the location parameter, a current location in which the terminal device is located, and determining, according to a current value of the activity parameter and a current value of the environmental parameter, a current activity of a user corresponding to the terminal device; and determining the current context of the terminal device according to the current location and the current activity.

It should be noted that a detailed process in which the current context of the terminal device is determined according to the current value of the context parameter is already described in detail in step 102 in Embodiment 1, and details are not described herein again.

403. Acquire a color ring back tone music set corresponding to the current context.

The color ring back tone music set includes one or more pieces of color ring back tone music.

It should be noted that the present disclosure sets no specific limitation on a quantity of color ring back tone music included in the color ring back tone music set. In an actual application, the quantity of color ring back tone music may be determined according to an actual need.

Further, the acquiring a color ring back tone music set corresponding to the current context may include acquiring the color ring back tone music set whose semantic relevancy between a label of color ring back tone music and the current context is greater than a preset threshold.

Further, the acquiring the color ring back tone music set whose semantic relevancy between a label of color ring back tone music and the current context is greater than a preset threshold may include analyzing a use record of the user using a data analysis technology, so as to obtain a music type that the user is interested in, where the use record of the user includes any one or any combination of the following: a color ring back tone use record of the user and a color ring back tone music listening record of the user; and acquiring, from the music type that the user is interested in, the color ring back tone music set whose semantic relevancy between the label of the color ring back tone music and the current context is greater than the preset threshold.

It should be noted that the preset threshold may be determined according to an actual need, and the present disclosure sets no specific limitation thereto.

The label of the color ring back tone music indicates a characteristic of the color ring back tone music, and may include information such as a song name, a singer, an album name, an age, a song style, a type, and a remark that are of the color ring back tone music. The present disclosure sets no limitation on specific content of the label of the color ring back tone music. The semantic relevancy in this embodiment of the present disclosure refers to a relevance degree between two words in a corpus in one or more dimensions, where the dimensions may include a word meaning, a word style, a part of speech, and the like. For example, if a context information entered by the user is "at home", semantic relevancy determining may be performed in the corpus, it is calculated that a semantic similarity between "home" and "romance" is 0.822 in terms of the word style, and it is calculated that a semantic similarity between "home" and "inspiration" is 0.48 in terms of the word style.

The semantic relevancy refers to a relevance degree between two words in the corpus in different dimensions, where the different dimensions may include the word meaning, the word style, the part of speech, and the like. For example, if the context information entered by the user is at home, the semantic relevancy determining may be performed in the corpus, it is calculated that the semantic similarity between "home" and "romance" is 0.822, and it is calculated that the semantic similarity between "home" and "inspiration" is 0.48.

It should be noted that the corpus may be selected according to an actual need. Currently, some online corpora may be selected, and the corpus may also be collected and established on the terminal device. The present disclosure sets a limitation thereto. A solution in the prior art may be used to collect and establish the corpus, and details are not described in this embodiment of the present disclosure.

It should be noted that the color ring back tone music set may be selected from all music in a music library, where the music library may be a color ring back tone music website disclosed by a network operator, or may be another music website. The present disclosure sets no specific limitation thereto.

It should further be noted that the quantity of the color ring back tone music included in the color ring back tone music set may be determined according to an actual need, and the present disclosure sets no specific limitation thereto.

404. Provide all or some music in the color ring back tone music set for a user, so that the user determines, from the color ring back tone music set, color ring back tone music corresponding to the current context.

Further, the providing all or some music in the color ring back tone music set for a user, so that the user determines, from the color ring back tone music set, color ring back tone music corresponding to the current context may include sorting all color ring back tone music in the color ring back tone music set in a descending order according to a popularity degree, and selecting the first W pieces of color ring back tone music and providing them for the user, so that the user determines, from the W pieces of color ring back tone music, the color ring back tone music corresponding to the current context, where W is greater than or equal to 1.

The popularity degree may include a quantity of access times within a fixed period of time, a quantity of access users, or access frequency. A value of W may be determined according to an actual need, and the present disclosure sets no specific limitation thereto.

It should be noted that for sameness or a similarity between the method provided in Embodiment 4 of the present disclosure and a method provided in the foregoing embodiment, reference may be made to description of the foregoing embodiment, and details are not described in this embodiment of the present disclosure.

It can be learned that according to the method for determining color ring back tone music provided in this embodiment of the present disclosure, a current value of a context parameter of a terminal device is acquired, a current context of the terminal device is determined according to the current value of the context parameter, a color ring back tone music set corresponding to the current context is acquired, and all or some music in the color ring back tone music set is provided for a user, so that the user determines, from the color ring back tone music set, color ring back tone music corresponding to the current context, thereby dynamically determining the color ring back tone music according to the current context, and improving user experience of the terminal device.

Embodiment 5

Figure 5:
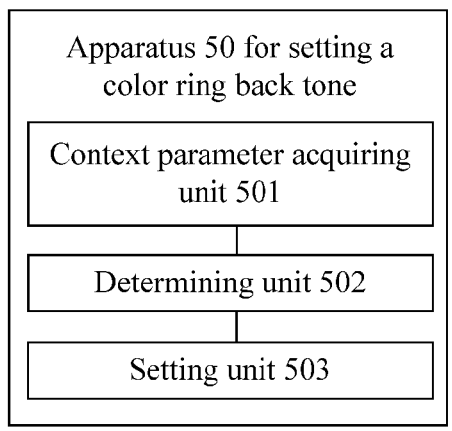
FIG. 5 is a schematic structural diagram of an apparatus for setting a color ring back tone according to an embodiment of the present disclosure.

Embodiment 5 of the present disclosure provides an apparatus 50 for setting a color ring back tone, where the apparatus 50 may be an independent apparatus and is preferably disposed in a terminal device. Referring to FIG. 5, the apparatus 50 for setting a color ring back tone may include a context parameter acquiring unit 501 configured to acquire a current value of a context parameter of the terminal device, where the context parameter indicates a characteristic of a context in which the terminal device is applied, and the context parameter includes any one or more of the following: a location parameter, an activity parameter, and an environmental parameter; a determining unit 502 configured to determine a current context of the terminal device according to the current value that is of the context parameter and that is acquired by the acquiring unit 501; and a setting unit 503 configured to set a color ring back tone of the terminal device to color ring back tone music corresponding to the current context.

When the context parameter includes the location parameter, the activity parameter, and the environmental parameter, the determining unit 502 may be configured to determine, according to a current value of the location parameter, a current location in which the terminal device is located, determine, according to a current value of the activity parameter and a current value of the environmental parameter, a current activity of a user corresponding to the terminal device, and determine the current context of the terminal device according to the current location and the current activity.

In an implementation manner, a correspondence between multiple contexts and a variety of color ring back tone music that are of the terminal device is stored in the terminal device, and the setting unit 503 may be configured to set, according to the correspondence between the multiple contexts and the variety of color ring back tone music that are of the terminal device, the color ring back tone of the terminal device to the color ring back tone music corresponding to the current context.

The correspondence between the multiple contexts and the variety of color ring back tone music that are of the terminal device includes the multiple contexts and a variety of color ring back tone music corresponding to the contexts. The correspondence may be set by a user using the terminal device, or may be set by the terminal device by default, or may be determined by the user of the terminal device after initial determining by the terminal device; or another implementation manner is used. This embodiment of the present disclosure sets no limitation thereto. It should be noted that when the correspondence is set by the terminal device by default, specific content of the correspondence may be set according to a customary rule. The present disclosure sets no limitation thereto. For example, a conference context corresponds to color ring back tone music whose music title includes "conference".

Optionally, in the correspondence, a context identifier and a color ring back tone identifier corresponding to the context identifier may be stored, and the context identifier and an address of color ring back tone music corresponding to the context identifier may also be stored. The present disclosure sets no specific limitation on a context and a type of color ring back tone music that are stored in the correspondence, which may be determined according to an actual need.

The context identifier is information that can uniquely identify the context, and at least includes any one of the following identifiers: a context name, a context label, a context code, and the like. The present disclosure sets no specific limitation thereto.

The color ring back tone identifier is information that can uniquely identify the color ring back tone, and at least includes any one of the following identifiers: a color ring back tone name, a color ring back tone label, a color ring back tone code, and the like. The present disclosure sets no specific limitation thereto.

The address of the color ring back tone music may include a network address or a link address of another form or an address of another form of the color ring back tone music. The present disclosure sets no specific limitation thereto.

Optionally, according to a difference in the context and the type of color ring back tone music that are stored in the correspondence, that the color ring back tone of the terminal device is set, according to the correspondence between the multiple contexts and the variety of color ring back tone music that are of the terminal device, to the color ring back tone music corresponding to the current context may include either of the following two manners:

A first manner: when the correspondence includes the context identifier and the color ring back tone identifier corresponding to the context identifier, a color ring back tone identifier corresponding to a current context identifier is determined according to the correspondence; and the color ring back tone of the terminal device is set to color ring back tone music indicated by the color ring back tone identifier.

A second manner: when the correspondence includes the context identifier and the address of the color ring back tone music corresponding to the context identifier, an address of the color ring back tone music corresponding to a current context identifier is determined according to the correspondence; and the color ring back tone of the terminal device is set to color ring back tone music stored in the address of the color ring back tone music.

Figure 6A:
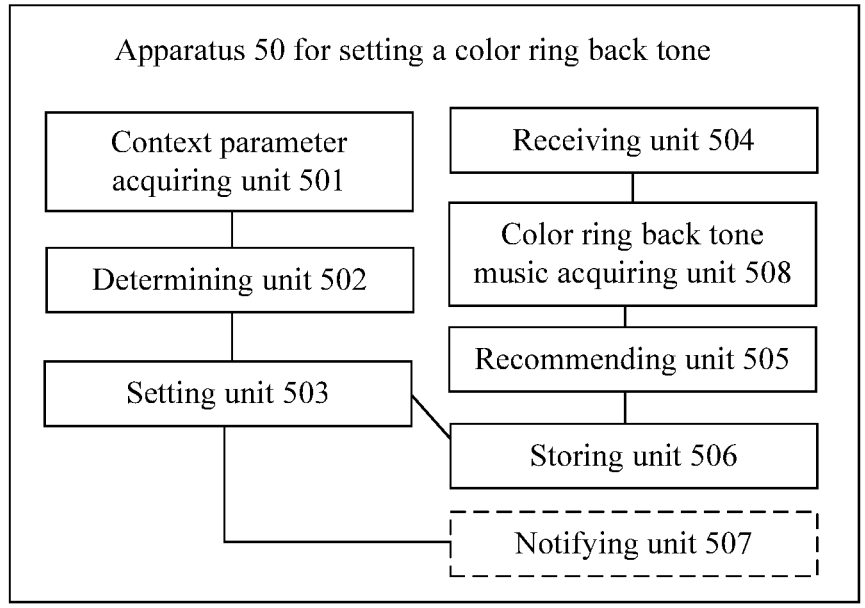
FIG. 6A is a schematic structural diagram of another apparatus for setting a color ring back tone according to an embodiment of the present disclosure.

For a process of establishing the correspondence, refer to FIG. 6A. The apparatus 50 may further include a receiving unit 504 configured to receive context information entered by a user; a color ring back tone music acquiring unit 508 configured to acquire a first color ring back tone music set matching the context information entered by the user, where the first color ring back tone music set includes M pieces of color ring back tone music, and M is greater than or equal to 1; a recommending unit 505 configured to recommend N pieces of color ring back tone music in the first color ring back tone music set to the user for user selection, where N is greater than or equal to 1, and N is less than or equal to M; and a storing unit 506 configured to store a correspondence between color ring back tone music selected by the user and the context information entered by the user.

Optionally, the color ring back tone music acquiring unit 508 may be configured to acquire the first color ring back tone music set whose semantic relevancy between a label of color ring back tone music and the context information entered by the user is greater than a first preset threshold. Further, the color ring back tone music acquiring unit 508 is configured to analyze a use record of the user using a data analysis technology, so as to obtain a music type that the user is interested in, where the use record of the user includes any one or any combination of the following: a color ring back tone use record of the user and a color ring back tone music listening record of the user; and acquire, from the music type that the user is interested in, the first color ring back tone music set whose semantic relevancy between the label of the color ring back tone music and the context information entered by the user is greater than the first preset threshold.

Further, the recommending unit 505 may be configured to sort all color ring back tone music in the first color ring back tone music set in a descending order according to a popularity degree, and select and recommend the first N pieces of color ring back tone music for user selection, where the popularity degree is determined by any one or more of the following factors: a quantity of access times within a fixed period of time, a quantity of access users, and access frequency per unit time.

Figure 6B:
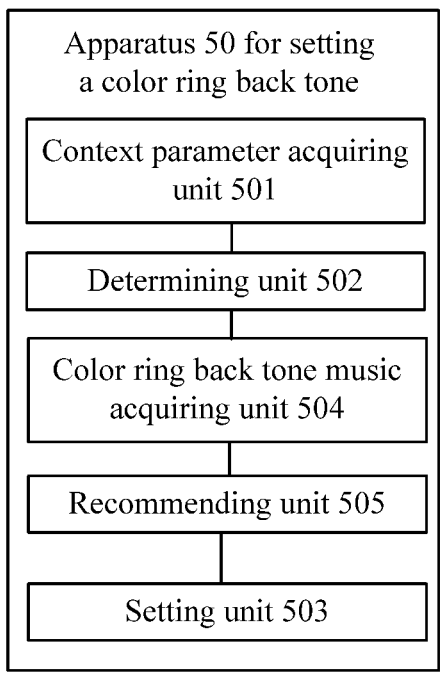
FIG. 6B is a schematic structural diagram of still another apparatus for setting a color ring back tone according to an embodiment of the present disclosure.

In another implementation manner, as shown in FIG. 6B, after the determining unit 502 determines the current context of the terminal device, the color ring back tone music acquiring unit 504 is configured to acquire a second color ring back tone music set matching the current context, where the second color ring back tone music set includes Q pieces of color ring back tone music, and Q is greater than or equal to 1; and the recommending unit 505 is configured to recommend P pieces of color ring back tone music in the second color ring back tone music set to the user for user selection, where P is greater than or equal to 1, and P is less than or equal to Q.

Correspondingly, the setting unit 503 may be configured to set the color ring back tone of the terminal device to color ring back tone music selected by the user.

Optionally, the color ring back tone music acquiring unit 504 is configured to acquire the second color ring back tone music set whose semantic relevancy between a label of color ring back tone music and the current context is greater than a second preset threshold. Further, the color ring back tone music acquiring unit 504 is configured to analyze a use record of the user using a data analysis technology, so as to obtain a music type that the user is interested in, where the use record of the user includes any one or any combination of the following: a color ring back tone use record of the user and a color ring back tone music listening record of the user; and acquire, from the music type that the user is interested in, the second color ring back tone music set whose semantic relevancy between the label of the color ring back tone music and the current context is greater than the second preset threshold.

Further, the recommending unit 505 is configured to sort all color ring back tone music in the second color ring back tone music set in a descending order according to a popularity degree, and select and recommend the first P pieces of color ring back tone music for user selection, where the popularity degree is determined by any one or more of the following factors: a quantity of access times within a fixed period of time, a quantity of access users, and access frequency per unit time.

In this implementation manner, a storing unit 506 may further be included and is mainly configured to store a correspondence between the color ring back tone music selected by the user and the current context, so that when the terminal device is in the current context next time, the color ring back tone is set, according to the correspondence, to the color ring back tone music that is selected by the user and that corresponds to the current context.

Further, referring to FIG. 6A, the apparatus 50 may further include a notifying unit 507 configured to notify the user that the color ring back tone of the terminal device is already set to the color ring back tone music corresponding to the current context. It can be understood that the apparatus shown in FIG. 6B may also include the notifying unit 507 with a same function.

It can be learned that according to the apparatus 50 for setting a color ring back tone provided in this embodiment of the present disclosure, a current value of a context parameter of a terminal device is acquired, a current context of the terminal device is determined according to the current value of the context parameter, and a color ring back tone of the terminal device is set to color ring back tone music corresponding to the current context, which implements automatic setting of color ring back tone music of the terminal device according to the current context of the terminal device, and resolves a problem in the prior art that manual setting of a color ring back tone is tedious and inconvenient when a user has multiple activities or a location is frequently changed, thereby improving user experience of the terminal device.

Further, efficiency of dynamically setting color ring back tone music is improved by pre-storing, in the terminal device, a correspondence between a context and the color ring back tone music. Alternatively, in a manner in which the color ring back tone music is instantly acquired and dynamically set instantly according to a user selection, a problem of an incomprehensive correspondence may be resolved to a certain extent, and a new correspondence may be stored in time, which ensures efficiency of dynamically setting the color ring back tone music when a same context is encountered next time.

Further, when color ring back tone music matched with the current context is acquired, the color ring back tone music may be selected, with reference to a use record of the user, as far as possible from a music type that the user is interested in, which increases a success rate of setting the color ring back tone music, and further improves the user experience of the terminal device.

Embodiment 6

Figure 7:
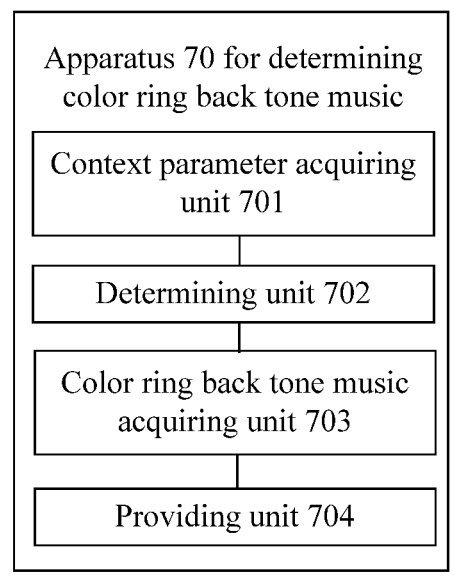
FIG. 7 is a schematic structural diagram of an apparatus for determining color ring back tone music according to an embodiment of the present disclosure.

Embodiment 6 of the present disclosure provides an apparatus 70 for determining color ring back tone music, where the apparatus 70 may be an independent apparatus and is preferably disposed in a terminal device. Referring to FIG. 7, the apparatus 70 for determining color ring back tone music may include a context parameter acquiring unit 701 configured to acquire a current value of a context parameter of the terminal device, where the context parameter indicates a characteristic of a context in which the terminal device is applied, and the context parameter includes any one or more of the following: a location parameter, an activity parameter, and an environmental parameter; a determining unit 702 configured to determine a current context of the terminal device according to the current value of the context parameter; a color ring back tone music acquiring unit 703 configured to acquire a color ring back tone music set corresponding to the current context, where the color ring back tone music set includes one or more pieces of color ring back tone music; and a providing unit 704 configured to provide all or some music in the color ring back tone music set for a user, so that the user determines, from the color ring back tone music set, color ring back tone music corresponding to the current context.

Further, when the context parameter includes the location parameter, the activity parameter, and the environmental parameter, the determining unit 702 may be configured to determine, according to a current value of the location parameter, a current location in which the terminal device is located, determine, according to a current value of the activity parameter and a current value of the environmental parameter, a current activity of a user corresponding to the terminal device, and determine the current context of the terminal device according to the current location and the current activity.

Preferably, the color ring back tone music acquiring unit 703 is configured to acquire the color ring back tone music set whose semantic relevancy between a label of color ring back tone music and the current context is greater than a preset threshold. Specifically, the color ring back tone music acquiring unit 703 analyzes a use record of the user using a data analysis technology, so as to obtain a music type that the user is interested in, where the use record of the user includes any one or any combination of the following: a color ring back tone use record of the user and a color ring back tone music listening record of the user; and acquires, from the music type that the user is interested in, the color ring back tone music set whose semantic relevancy between the label of the color ring back tone music and the current context is greater than the preset threshold.

The providing unit 704 is configured to sort all U pieces of color ring back tone music in the color ring back tone music set in a descending order according to a popularity degree, and select the first W pieces of color ring back tone music and provide them for the user, so that the user determines, from the W pieces of color ring back tone music, the color ring back tone music corresponding to the current context, where U is greater than or equal to 1, and W is greater than or equal to 1 and less than or equal to U.

It can be learned that according to the apparatus 70 for determining color ring back tone music provided in this embodiment of the present disclosure, a current value of a context parameter of a terminal device is acquired, a current context of the terminal device is determined according to the current value of the context parameter, a color ring back tone music set corresponding to the current context is acquired, and all or some music in the color ring back tone music set is provided for a user, so that the user determines, from the color ring back tone music set, color ring back tone music corresponding to the current context, thereby dynamically determining the color ring back tone music according to the current context, and improving user experience of the terminal device.

Embodiment 7

Figure 8:
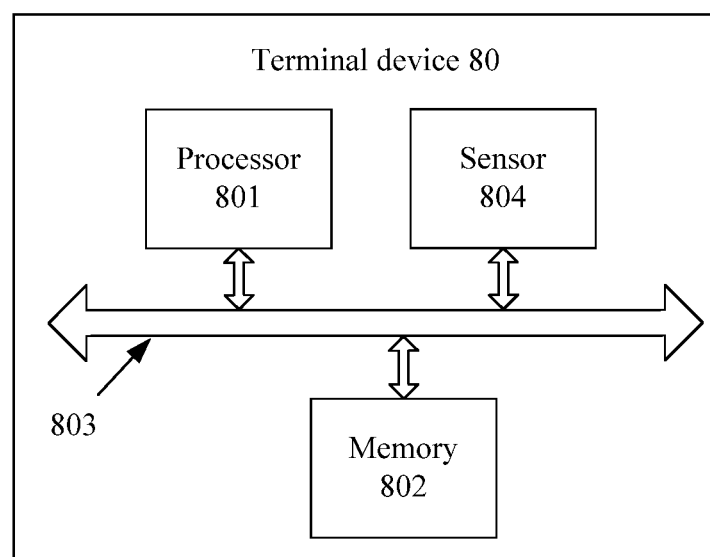
FIG. 8 is a schematic structural diagram of a terminal device according to an embodiment of the present disclosure.

Embodiment 7 of the present disclosure provides a terminal device 80. Referring to FIG. 8, the terminal device 80 may include a sensor 804 configured to collect a context parameter of the terminal device; at least one processor 801 and a memory 802; and a communications bus 803 configured to implement connection and mutual communication among the foregoing modules.

The communications bus 803 may be an Industry Standard Architecture (ISA) bus, a Peripheral Component Interconnect (PCI) bus, an Extended Industry Standard Architecture (EISA) bus, or the like. The bus 803 may be categorized into an address bus, a data bus, a control bus, and the like. For ease of representation, only one bold line is used in FIG. 8 to represent the bus 803, which, however, does not mean that there is only one bus or only one type of bus.

It should be noted that FIG. 8 is only an example for the terminal device, and in another terminal device, each module may be directly connected to the processor 801.

The memory 802 may include a read-only memory and a random access memory, and provides an instruction and data for the processor 801. A part of the memory 802 may further include a Non-Volatile Random Access Memory (NVRAM).

The processor 801 may be a Central Processing Unit (CPU), or an application specific integrated circuit (ASIC), or one or more integrated circuits configured to implement this embodiment of the present disclosure.

The sensor 804 is configured to acquire a current value of a context parameter of the terminal device, where the context parameter indicates a characteristic of a context in which the terminal device is applied, and the context parameter includes any one or any combination of the following: a location parameter, an activity parameter, and an environmental parameter.

The processor 801 is configured to determine a current context of the terminal device according to the current value that is of the context parameter and that is acquired by the sensor 804.

Further, when the context parameter includes the location parameter, the activity parameter, and the environmental parameter, the processor 801 may be configured to determine, according to a current value of the location parameter, a current location in which the terminal device is located, determine, according to a current value of the activity parameter and a current value of the environmental parameter, a current activity of a user corresponding to the terminal device, and determine the current context of the terminal device according to the current location and the current activity.

In an implementation manner, a correspondence between multiple contexts and a variety of color ring back tone music that are of the terminal device is stored in the terminal device, and the processor 801 may be configured to set, according to the correspondence between the multiple contexts and the variety of color ring back tone music that are of the terminal device, the color ring back tone of the terminal device to the color ring back tone music corresponding to the current context.

The correspondence between the multiple contexts and the variety of color ring back tone music that are of the terminal device includes the multiple contexts and a variety of color ring back tone music corresponding to the contexts. The correspondence may be set by a user using the terminal device, or may be set by the terminal device by default, or may be determined by the user of the terminal device after initial determining by the terminal device; or another implementation manner is used. This embodiment of the present disclosure sets no limitation thereto. It should be noted that when the correspondence is set by the terminal device by default, specific content of the correspondence may be set according to a customary rule. The present disclosure sets no limitation thereto. For example, a conference context corresponds to color ring back tone music whose music title includes "conference".

Optionally, in the correspondence, a context identifier and a color ring back tone identifier corresponding to the context identifier may be stored, and the context identifier and an address of color ring back tone music corresponding to the context identifier may also be stored. The present disclosure sets no specific limitation on a context and a type of color ring back tone music that are stored in the correspondence, which may be determined according to an actual need.

The context identifier is information that can uniquely identify the context, and at least includes any one of the following identifiers: a context name, a context label, a context code, and the like. The present disclosure sets no specific limitation thereto.

The color ring back tone identifier is information that can uniquely identify the color ring back tone, and at least includes any one of the following identifiers: a color ring back tone name, a color ring back tone label, a color ring back tone code, and the like. The present disclosure sets no specific limitation thereto.

The address of the color ring back tone music may include a website address or a link address of the color ring back tone music. The present disclosure sets no specific limitation thereto.

Optionally, according to a difference in the context and the type of color ring back tone music that are stored in the correspondence, that the color ring back tone of the terminal device is set, according to the correspondence between the multiple contexts and the variety of color ring back tone music that are of the terminal device, to the color ring back tone music corresponding to the current context may at least include either of the following two manners:

A first manner: when the correspondence includes the context identifier and the color ring back tone identifier corresponding to the context identifier, a color ring back tone identifier corresponding to a current context identifier is determined according to the correspondence; and the color ring back tone of the terminal device is set to color ring back tone music indicated by the color ring back tone identifier.

A second manner: when the correspondence includes the context identifier and the address of the color ring back tone music corresponding to the context identifier, an address of color ring back tone music corresponding to a current context identifier is determined according to the correspondence; and the color ring back tone of the terminal device is set to color ring back tone music stored in the address of the color ring back tone music.

Figure 9:
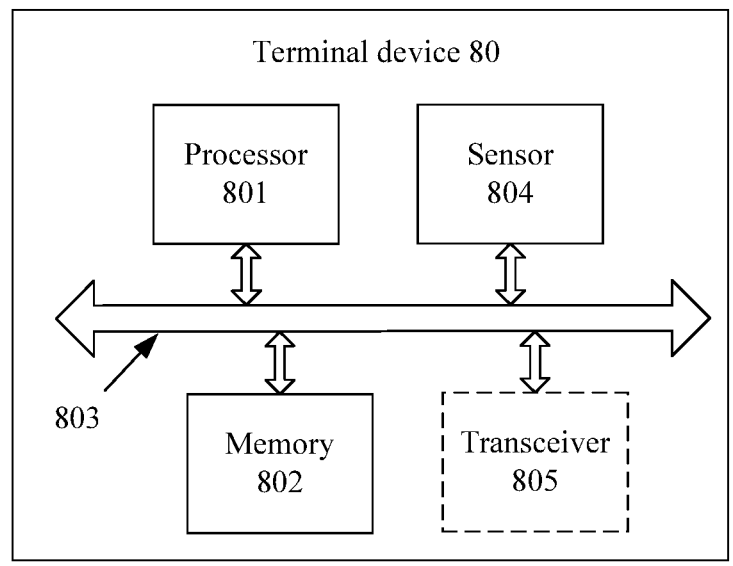
FIG. 9 is a schematic structural diagram of another terminal device according to an embodiment of the present disclosure.

Further, referring to FIG. 9, the terminal device 80 may further include a transceiver 805 configured to receive user input, or output a calculation result of the terminal device to the user, for example, receive context information entered by the user, or display a determined context or color ring back tone music to the user. The transceiver 805 may be implemented as a touchscreen.

The processor 801 may further be configured to acquire a first color ring back tone music set matching the context information entered by the user, where the first color ring back tone music set includes M pieces of color ring back tone music, and M is greater than or equal to 1.

The processor 801 may further be configured to recommend N pieces of color ring back tone music in the first color ring back tone music set to the user for user selection, where N is greater than or equal to 1, and N is less than or equal to M.

The processor 801 may further be configured to instruct the memory 802 to store a correspondence between color ring back tone music selected by the user and the context information entered by the user.

The processor 801 may be configured to acquire the first color ring back tone music set whose semantic relevancy between a label of color ring back tone music and the context information entered by the user is greater than a first preset threshold. Further, the processor 801 is configured to analyze a use record of the user using a data analysis technology, so as to obtain a music type that the user is interested in, where the use record of the user includes any one or any combination of the following: a color ring back tone use record of the user and a color ring back tone music listening record of the user; and acquire, from the music type that the user is interested in, the first color ring back tone music set whose semantic relevancy between the label of the color ring back tone music and the context information entered by the user is greater than the first preset threshold.

The processor 801 may be configured to: sort all color ring back tone music in the first color ring back tone music set in a descending order according to a popularity degree, and select and recommend the first N pieces of color ring back tone music for user selection, where the popularity degree is determined by any one or more of the following factors: a quantity of access times within a fixed period of time, a quantity of access users, and access frequency per unit time.

In another implementation manner, the processor 801 may further be configured to acquire a second color ring back tone music set matching the current context, where the second color ring back tone music set includes Q pieces of color ring back tone music, and Q is greater than or equal to 1; and recommend P pieces of color ring back tone music in the second color ring back tone music set to the user for user selection, where P is greater than or equal to 1, and P is less than or equal to Q.

Correspondingly, the processor 801 may be configured to set the color ring back tone of the terminal device to color ring back tone music selected by the user.

The processor 801 may further be configured to acquire the second color ring back tone music set whose semantic relevancy between a label of color ring back tone music and the current context is greater than a second preset threshold.

The processor 801 is configured to analyze a use record of the user using a data analysis technology, so as to obtain a music type that the user is interested in, where the use record of the user includes any one or any combination of the following: a color ring back tone use record of the user and a color ring back tone music listening record of the user; and acquire, from the music type that the user is interested in, the second color ring back tone music set whose semantic relevancy between the label of the color ring back tone music and the current context is greater than the second preset threshold.

The processor 801 may further be configured to sort all color ring back tone music in the second color ring back tone music set in a descending order according to a popularity degree, and select and recommend the first P pieces of color ring back tone music for user selection, where the popularity degree is determined by any one or more of the following factors: a quantity of access times within a fixed period of time, a quantity of access users, and access frequency per unit time.

Further, the processor 801 may further be configured to store a correspondence between the color ring back tone music selected by the user and the current context, so that when the terminal device is in the current context next time, the color ring back tone is set, according to the correspondence, to the color ring back tone music that is selected by the user and that corresponds to the current context.

Further, the processor 801 may further be configured to notify the user that the color ring back tone of the terminal device is already set to the color ring back tone music corresponding to the current context.

It can be learned that according to the terminal device 80 provided in this embodiment of the present disclosure, a current value of a context parameter of the terminal device is acquired, a current context of the terminal device is determined according to the current value of the context parameter, and a color ring back tone of the terminal device is set to color ring back tone music corresponding to the current context, which implements automatic setting of color ring back tone music of the terminal device according to the current context of the terminal device, and resolves a problem in the prior art that manual setting of a color ring back tone is tedious and inconvenient when a user has multiple activities or a location is frequently changed, thereby improving user experience of the terminal device.

Further, efficiency of dynamically setting color ring back tone music is improved by pre-storing, in the terminal device, a correspondence between a context and the color ring back tone music. Alternatively, in a manner in which the color ring back tone music is instantly acquired and dynamically set instantly according to a user selection, a problem of an incomprehensive correspondence may be resolved to a certain extent, and a new correspondence may be stored in time, which ensures efficiency of dynamically setting the color ring back tone music when a same context is encountered next time.

Further, when color ring back tone music matched with the current context is acquired, the color ring back tone music may be selected, with reference to a use record of the user, as far as possible from a music type that the user is interested in, which increases a success rate of setting the color ring back tone music, and further improves the user experience of the terminal device.

Embodiment 8

Figure 10:
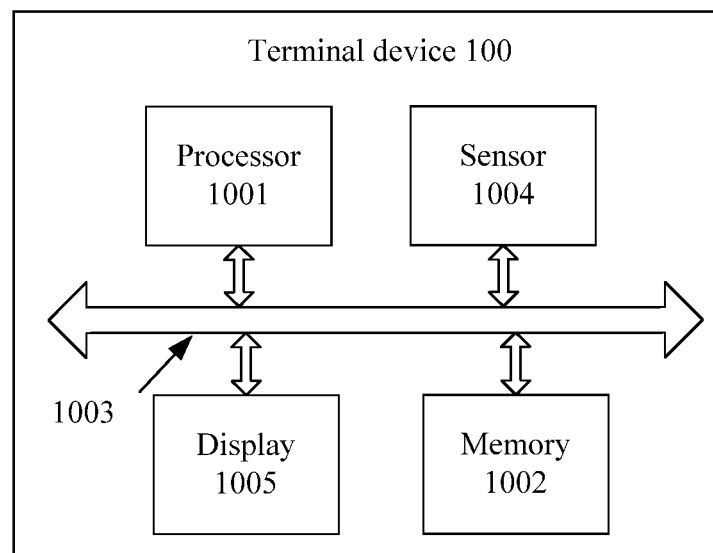
FIG. 10 is a schematic structural diagram of still another terminal device according to an embodiment of the present disclosure.

Embodiment 8 of the present disclosure provides another terminal device 100. Referring to FIG. 10, the terminal device 100 may include a sensor 1004, at least one processor 1001, a memory 1002, a display 1005, and a communications bus 1003 configured to implement connection and mutual communication among the foregoing modules.

The communications bus 1003 may be an ISA bus, a PCI bus, an EISA bus, or the like. The bus 1003 may be categorized into an address bus, a data bus, a control bus, and the like. For ease of representation, only one bold line is used in FIG. 10 to represent the bus 1003, which, however, does not mean that there is only one bus or only one type of bus.

The memory 1002 may include a read-only memory and a random access memory, and provides an instruction and data for the processor 1001. A part of the memory 1002 may further include an NVRAM.

The processor 1001 may be a CPU, or an ASIC, or one or more integrated circuits configured to implement this embodiment of the present disclosure.

The sensor 1004 is configured to acquire a current value of a context parameter of the terminal device, where the context parameter indicates a characteristic of a context in which the terminal device is applied, and the context parameter includes any one or more of the following: a location parameter, an activity parameter, and an environmental parameter.

The processor 1001 is configured to determine a current context of the terminal device according to the current value of the context parameter; acquire a color ring back tone music set corresponding to the current context, where the color ring back tone music set includes one or more pieces of color ring back tone music; and instruct the display 1005 to provide all or some music in the color ring back tone music set for a user, so that the user determines, from the color ring back tone music set, color ring back tone music corresponding to the current context.

Further, when the context parameter includes the location parameter, the activity parameter, and the environmental parameter, the processor 1001 may be configured to: determine, according to a current value of the location parameter, a current location in which the terminal device is located, determine, according to a current value of the activity parameter and a current value of the environmental parameter, a current activity of a user corresponding to the terminal device, and determine the current context of the terminal device according to the current location and the current activity.

Preferably, the processor 1001 may be configured to acquire the color ring back tone music set whose semantic relevancy between a label of color ring back tone music and the current context is greater than a preset threshold.

Further, the processor 1001 may further be configured to analyze a use record of the user using a data analysis technology, so as to obtain a music type that the user is interested in, where the use record of the user includes any one or any combination of the following: a color ring back tone use record of the user and a color ring back tone music listening record of the user; and acquire, from the music type that the user is interested in, the color ring back tone music set whose semantic relevancy between the label of the color ring back tone music and the current context is greater than the preset threshold.

Further, the processor 1001 may be configured to sort all U pieces of color ring back tone music in the color ring back tone music set in a descending order according to a popularity degree, and select the first W pieces of color ring back tone music and provide them for the user, so that the user determines, from the W pieces of color ring back tone music, the color ring back tone music corresponding to the current context, where U is greater than or equal to 1, and W is greater than or equal to 1 and less than or equal to U; the popularity degree is determined by any one or more of the following factors: a quantity of access times within a fixed period of time, a quantity of access users, and access frequency per unit time.

It can be learned that according to the terminal device 100 provided in this embodiment of the present disclosure, a current value of a context parameter of the terminal device is acquired, a current context of the terminal device is determined according to the current value of the context parameter, a color ring back tone music set corresponding to the current context is acquired, and all or some music in the color ring back tone music set is provided for a user, so that the user determines, from the color ring back tone music set, color ring back tone music corresponding to the current context, thereby dynamically determining the color ring back tone music according to the current context, and improving user experience of the terminal device.

Embodiment 9

Embodiment 9 of the present disclosure provides a terminal device 110, where the terminal device 110 may be a mobile phone, a tablet computer, a Personal Digital Assistant (PDA), a Point of Sales (POS), a vehicle-mounted computer, or the like.

Figure 11:
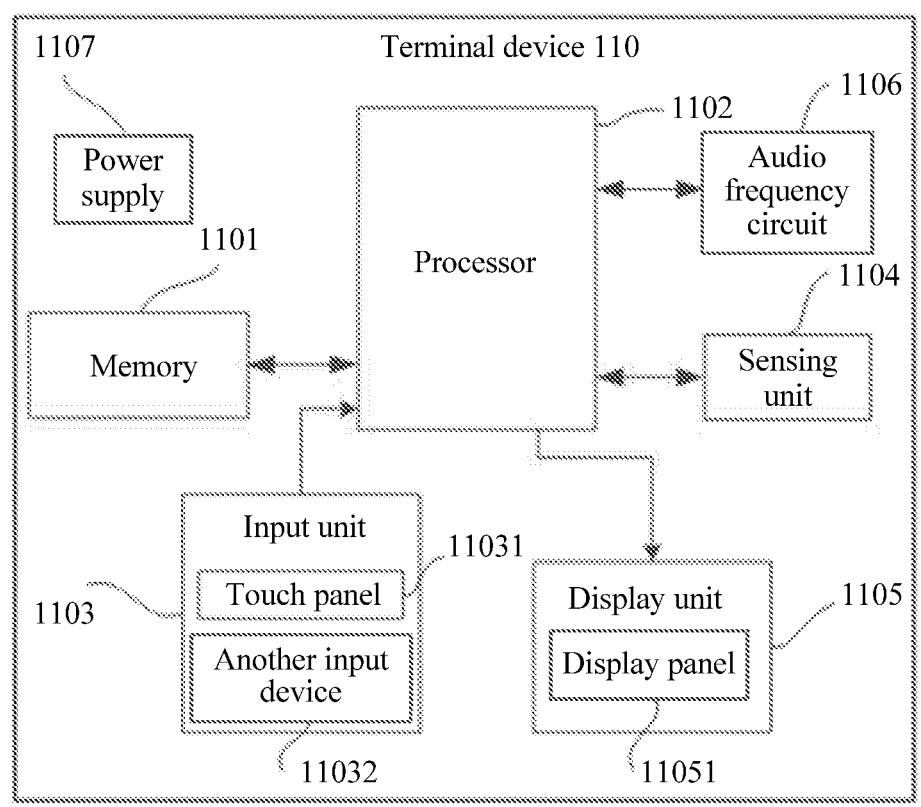
FIG. 11 is a schematic structural diagram of yet another terminal device according to an embodiment of the present disclosure.

Referring to FIG. 11, FIG. 11 shows a schematic structural diagram of a terminal device 110 according to an embodiment of the present disclosure. Referring to FIG. 11, the terminal device 110 in this embodiment of the present disclosure includes a memory 1101, a processor 1102, an input unit 1103, and a sensing unit 1104.

The sensing unit 1104 may be a sensing device in the terminal device 110 and is configured to acquire a current value of a context parameter of a terminal device, where the context parameter indicates a characteristic of a context in which the terminal device is applied, and the context parameter includes any one or any combination of the following: a location parameter, an activity parameter, and an environmental parameter.

The processor 1102 is a control center of the terminal device 110, is connected to each part of the entire terminal device using various interfaces and lines, and executes various functions of the terminal device 110 and processes data by running or executing a software program and/or a module stored in the memory 1101 and by invoking data stored in the memory 1101, so as to perform overall monitoring on the terminal device 110. Optionally, the processor 1102 may include one or more processing units.

The processor 1102 may be configured to determine a current context of the terminal device according to the current value that is of the context parameter and that is acquired by the sensing unit 1104. The processor 1102 is further configured to set a color ring back tone of the terminal device to color ring back tone music corresponding to the current context.

The memory 1101 stores a correspondence that is between multiple contexts and a variety of color ring back tone music and that is preset by the terminal device 110, where the correspondence includes the multiple contexts and a variety of color ring back tone music corresponding to the contexts. The processor 1102 is configured to set, according to the correspondence that is between the multiple contexts and the variety of color ring back tone music and that is stored in the memory 1101, the color ring back tone of the terminal device to the color ring back tone music corresponding to the current context.

Optionally, in the correspondence stored in the memory 1101, a context identifier and a color ring back tone identifier corresponding to the context identifier may be stored, and the context identifier and an address of color ring back tone music corresponding to the context identifier may also be stored. The present disclosure sets no specific limitation on a context and a type of color ring back tone music that are stored in the correspondence, which may be determined according to an actual need.

Optionally, according to a difference in the context and the type of color ring back tone music that are stored in the correspondence, that the processor 1102 sets, according to the correspondence that is between the multiple contexts and the variety of color ring back tone music and that is stored in the memory 1101, the color ring back tone of the terminal device to the color ring back tone music corresponding to the current context may include, when the correspondence stored in the memory 1101 includes the context identifier and the color ring back tone identifier corresponding to the context identifier, the processor 1102 determines, according to the correspondence, a color ring back tone identifier corresponding to a current context identifier; and sets the color ring back tone of the terminal device to color ring back tone music indicated by the color ring back tone identifier. Alternatively, when the correspondence stored in the memory 1101 includes the context identifier and the address of the color ring back tone music corresponding to the context identifier, the processor 1102 determines, according to the correspondence, an address of color ring back tone music corresponding to a current context identifier; and sets the color ring back tone of the terminal device to color ring back tone music stored in the address of the color ring back tone music.

The input unit 1103 is configured to receive context information entered by a user, where the context information is used to indicate a corresponding context. The input unit 1103 in this embodiment may include a touch panel 11031. The touch panel 11031, also referred to as a touchscreen, can collect a touch operation of the user on or near the touch panel 11031 (for example, an operation of the user on the touch panel 11031 or near the touch panel 11031 using any proper object or accessory, such as a finger or a stylus), and can drive a corresponding connection apparatus according to a preset program. Optionally, the touch panel 11031 may include two parts: a touch detection apparatus and a touch controller. The touch detection apparatus detects a touch position of the user, detects a signal brought by a touch operation, and transfers the signal to the touch controller; the touch controller receives touch information from the touch detection apparatus, converts the touch information into coordinates of a touch point, then sends the coordinates of the touch point to the processor 1102, and can receive and execute a command sent by the processor 1102. In addition, the touch panel 11031 may be implemented using multiple types, such as a resistive type, a capacitive type, infrared, and a surface acoustic wave. In addition to the touch panel 11031, the input unit 1103 may further include another input device 11032, where the another input device 11032 may include but is not limited to one or more of a physical keyboard, a functional key (such as a volume control key or a switch key), a trackball, a mouse, an operating rod, and the like.

In an implementation manner, the processor 1102 acquires, according to the context information that is entered by the user and that is received by the input unit 1103, a first color ring back tone music set matching the context information entered by the user, where the first color ring back tone music set includes M pieces of color ring back tone music, and M is greater than or equal to 1; the processor 1102 is further configured to recommend N pieces of color ring back tone music in the first color ring back tone music set to the user for user selection, where N is greater than or equal to 1, and N is less than or equal to M; the processor 1102 is further configured to store, in the memory 1101, a correspondence between color ring back tone music selected by the user and the context information entered by the user.

That the processor 1102 is configured to acquire, according to the context information that is entered by the user and that is received by the input unit 1103, the first color ring back tone music set matching the context information entered by the user may include that the processor 1102 acquires, according to the context information that is entered by the user and that is received by the input unit 1103, the first color ring back tone music set whose semantic relevancy between a label of color ring back tone music and the context information entered by the user is greater than a first preset threshold.

Further, that the processor 1102 acquires, according to the context information that is entered by the user and that is received by the input unit 1103, the first color ring back tone music set whose semantic relevancy between a label of color ring back tone music and the context information entered by the user is greater than a first preset threshold may include that the processor 1102 analyzes, according to the context information that is entered by the user and that is received by the input unit 1103, a use record of the user using a data analysis technology, so as to obtain a music type that the user is interested in, where the use record of the user includes any one or any combination of the following: a color ring back tone use record of the user and a color ring back tone music listening record of the user; and acquires, from the music type that the user is interested in, the first color ring back tone music set whose semantic relevancy between the label of the color ring back tone music and the context information entered by the user is greater than the first preset threshold.

Further, that the processor 1102 recommends the N pieces of color ring back tone music in the first color ring back tone music set to the user for user selection may include that sorting all color ring back tone music in the first color ring back tone music set in a descending order according to a popularity degree, and selecting and recommending the first N pieces of color ring back tone music for user selection.

In another implementation manner, the processor 1102 may further be configured to acquire a second color ring back tone music set matching the current context, where the second color ring back tone music set includes Q pieces of color ring back tone music, and Q is greater than or equal to 1; the processor 1102 may further be configured to recommend P pieces of color ring back tone music in the second color ring back tone music set to the user for user selection, where P is greater than or equal to 1, and P is less than or equal to Q; the processor 1102 may further be configured to set the color ring back tone of the terminal device 110 to color ring back tone music selected by the user.

Further, that the processor 1102 acquires the second color ring back tone music set matching the current context is that the processor 1102 acquires the second color ring back tone music set whose semantic relevancy between a label of color ring back tone music and the current context is greater than a second preset threshold.

Further, that the processor 1102 acquires the second color ring back tone music set whose semantic relevancy between a label of color ring back tone music and the current context is greater than a second preset threshold is that the processor 1102 analyzes a use record of the user using a data analysis technology, so as to obtain a music type that the user is interested in, where the use record of the user includes any one or any combination of the following: a color ring back tone use record of the user and a color ring back tone music listening record of the user; and acquires, from the music type that the user is interested in, the second color ring back tone music set whose semantic relevancy between the label of the color ring back tone music and the current context is greater than the second preset threshold.

That the processor 1102 recommends the P pieces of color ring back tone music in the second color ring back tone music set to the user for user selection is that the processor 1102 sorts all color ring back tone music in the second color ring back tone music set in a descending order according to a popularity degree, and selects and recommends the first P pieces of color ring back tone music for user selection, where the popularity degree is determined by any one or more of the following factors: a quantity of access times within a fixed period of time, a quantity of access users, and access frequency per unit time.

Further, the processor 1102 may further store a correspondence between the color ring back tone music selected by the user and the current context in the memory 1101, so that when the terminal device is in the current context next time, the color ring back tone is set, according to the correspondence, to the color ring back tone music that is selected by the user and that corresponds to the current context.

The terminal device 110 may further include a display unit 1105, where the display unit 1105 may be configured to display information entered by the user or information provided for the user and various interfaces of the terminal device 110. The display unit 1105 may include a display panel 11051, and optionally, the display panel 11051 may be configured in a form of a Liquid Crystal Display (LCD), an Organic Light-Emitting Diode (OLED), or the like. The display unit 1105 may notify, in a form of a character, an animation, and the like, the user that the color ring back tone of the terminal device is already set to the color ring back tone music corresponding to the current context.

Further, the terminal device 110 may further include an audio frequency circuit 1106 configured to output audio when the user listens to the color ring back tone music. The audio frequency circuit 1106 may further notify, in a form of audio, the user that the color ring back tone of the terminal device is already set to the color ring back tone music corresponding to the current context.

Further, the terminal device 110 may further include a power supply 1107 configured to supply power to each unit in the terminal device 110.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to an actual need to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:
1. A method for setting a color ring back tone, comprising:
acquiring a current value of a context parameter of a terminal device, wherein the context parameter indicates a characteristic of a context in which the terminal device is applied, and wherein the context parameter comprises any one or any combination of the following: a location parameter, an activity parameter, and an environmental parameter;

determining a current context of the terminal device according to the current value of the context parameter; and setting a color ring back tone of the terminal device to color ring back tone music corresponding to the current context.

2. The method for setting a color ring back tone according to claim 1, wherein setting the color ring back tone of the terminal device to the color ring back tone music corresponding to the current context comprises setting, according to a correspondence between multiple contexts and a variety of color ring back tone music that are of the terminal device, the color ring back tone of the terminal device to the color ring back tone music corresponding to the current context.

3. The method for setting a color ring back tone according to claim 2, wherein setting the color ring back tone of the terminal device to the color ring back tone music corresponding to the current context comprises:

determining, according to the correspondence, a color ring back tone identifier corresponding to a current context identifier, wherein the correspondence comprises a context identifier and a color ring back tone identifier corresponding to the context identifier; and setting the color ring back tone of the terminal device to color ring back tone music indicated by the color ring back tone identifier.

4. The method for setting a color ring back tone according to claim 2, wherein setting the color ring back tone of the terminal device to the color ring back tone music corresponding to the current context comprises:

determining, according to the correspondence, an address of color ring back tone music corresponding to a current context identifier, wherein the correspondence comprises a context identifier and an address of color ring back tone music corresponding to the context identifier; and setting the color ring back tone of the terminal device to color ring back tone music stored in the address of the color ring back tone music.

5. The method for setting a color ring back tone according to claim 2, wherein the method further comprises:

receiving context information entered by a user, wherein the context information is used to indicate a corresponding context;

acquiring a first color ring back tone music set matching the context information entered by the user, wherein the first color ring back tone music set comprises M pieces of color ring back tone music, and wherein M is greater than or equal to 1;

recommending N pieces of color ring back tone music in the first color ring back tone music set to the user for user selection, wherein N is greater than or equal to 1, and wherein N is less than or equal to M; and storing a correspondence between color ring back tone music selected by the user and the context information entered by the user.

6. The method for setting a color ring back tone according to claim 5, wherein acquiring the first color ring back tone music set matching the context information entered by the user comprises acquiring the first color ring back tone music set whose semantic relevancy between a label of color ring back tone music and the context information entered by the user is greater than a first preset threshold.

7. The method for setting a color ring back tone according to claim 6, wherein acquiring the first color ring back tone music set whose semantic relevancy between the label of color ring back tone music and the context information entered by the user is greater than the first preset threshold comprises:

analyzing a use record of the user using a data analysis technology, so as to obtain a music type that the user is interested in, wherein the use record of the user comprises any one or any combination of the following: a color ring back tone use record of the user and a color ring back tone music listening record of the user; and acquiring, from the music type that the user is interested in, the first color ring back tone music set whose semantic relevancy between the label of the color ring back tone music and the context information entered by the user is greater than the first preset threshold.

8. The method for setting a color ring back tone according to claim 5, wherein recommending N pieces of color ring back tone music in the first color ring back tone music set to the user for user selection comprises:

sorting all color ring back tone music in the first color ring back tone music set in a descending order according to a popularity degree; and recommending the first N pieces of color ring back tone music for user selection, and wherein the popularity degree is determined by any one or more of the following factors: a quantity of access times within a fixed period of time, a quantity of access users, and access frequency per unit time.

9. The method for setting a color ring back tone according to claim 1, wherein before setting the color ring back tone of the terminal device to the color ring back tone music corresponding to the current context, and after determining the current context of the terminal device according to the current value of the context parameter, the method further comprises:

acquiring a second color ring back tone music set matching the current context, wherein the second color ring back tone music set comprises Q pieces of color ring back tone music, and wherein Q is greater than or equal to 1; and recommending P pieces of color ring back tone music in the second color ring back tone music set to the user for user selection, wherein P is greater than or equal to 1, and wherein P is less than or equal to Q, and wherein setting the color ring back tone of the terminal device to color ring back tone music corresponding to the current context comprises setting the color ring back tone of the terminal device to color ring back tone music selected by the user.

10. The method for setting a color ring back tone according to claim 9, wherein acquiring the second color ring back tone music set matching the current context comprises acquiring the second color ring back tone music set whose semantic relevancy between a label of color ring back tone music and the current context is greater than a second preset threshold.

11. The method for setting a color ring back tone according to claim 10, wherein acquiring the second color ring back tone music set whose semantic relevancy between a label of color ring back tone music and the current context is greater than a second preset threshold comprises:

analyzing a use record of the user using a data analysis technology, so as to obtain a music type that the user is interested in, wherein the use record of the user comprises any one or any combination of the following: a color ring back tone use record of the user and a color ring back tone music listening record of the user; and acquiring, from the music type that the user is interested in, the second color ring back tone music set whose semantic relevancy between the label of the color ring back tone music and the current context is greater than the second preset threshold.

12. The method for setting a color ring back tone according to claim 9, wherein recommending P pieces of color ring back tone music in the second color ring back tone music set to the user for user selection comprises:

sorting all color ring back tone music in the second color ring back tone music set in a descending order according to a popularity degree; and selecting and recommending the first P pieces of color ring back tone music for user selection, wherein the popularity degree is determined by any one or more of the following factors: a quantity of access times within a fixed period of time, a quantity of access users, and access frequency per unit time.

13. The method for setting a color ring back tone according to claim 9, wherein the method further comprises storing a correspondence between the color ring back tone music selected by the user and the current context, so that when the terminal device is in the current context next time, the color ring back tone is set, according to the correspondence, to the color ring back tone music that is selected by the user and that corresponds to the current context.

14. The method for setting a color ring back tone according to claim 1, wherein the method further comprises notifying the user that the color ring back tone of the terminal device is already set to the color ring back tone music corresponding to the current context.

15. A method for determining color ring back tone music, comprising:

acquiring a current value of a context parameter of a terminal device, wherein the context parameter indicates a characteristic of a context in which the terminal device is applied, and wherein the context parameter comprises any one or any combination of the following: a location parameter, an activity parameter, and an environmental parameter;

determining a current context of the terminal device according to the current value of the context parameter;

acquiring a color ring back tone music set corresponding to the current context, wherein the color ring back tone music set comprises one or more pieces of color ring back tone music; and providing all or some music in the color ring back tone music set for a user, so that the user determines, from the color ring back tone music set, color ring back tone music corresponding to the current context.

16. The method for determining color ring back tone music according to claim 15, wherein the acquiring a color ring back tone music set corresponding to the current context comprises acquiring the color ring back tone music set whose semantic relevancy between a label of color ring back tone music and the current context is greater than a preset threshold.

17. The method for determining color ring back tone music according to claim 16, wherein acquiring the color ring back tone music set whose semantic relevancy between a label of color ring back tone music and the current context is greater than a preset threshold comprises:

analyzing a use record of the user using a data analysis technology, so as to obtain a music type that the user is interested in, wherein the use record of the user comprises any one or any combination of the following: a color ring back tone use record of the user and a color ring back tone music listening record of the user; and acquiring, from the music type that the user is interested in, the color ring back tone music set whose semantic relevancy between the label of the color ring back tone music and the current context is greater than the preset threshold.

18. The method for determining color ring back tone music according to claim 15, wherein providing all or some music in the color ring back tone music set for the user comprises:

sorting all U pieces of color ring back tone music in the color ring back tone music set in a descending order according to a popularity degree; and selecting the first W pieces of color ring back tone music and providing them for the user, so that the user determines, from the W pieces of color ring back tone music, the color ring back tone music corresponding to the current context, wherein U is greater than or equal to 1, and W is greater than or equal to 1 and less than or equal to U, and wherein the popularity degree is determined by any one or more of the following factors: a quantity of access times within a fixed period of time, a quantity of access users, and access frequency per unit time.

19. An apparatus for setting a color ring back tone, comprising:

at least one processor configured to:

acquire a current value of a context parameter of a terminal device, wherein the context parameter indicates a characteristic of a context in which the terminal device is applied, and wherein the context parameter comprises any one or any combination of the following: a location parameter, an activity parameter, and an environmental parameter;

determine a current context of the terminal device according to the current value that is of the context parameter and that is acquired by the acquiring unit; and set a color ring back tone of the terminal device to color ring back tone music corresponding to the current context.

20. The apparatus for setting a color ring back tone according to claim 19, wherein the processor is further configured to set, according to a correspondence between multiple contexts and a variety of color ring back tone music that are of the terminal device, the color ring back tone of the terminal device to the color ring back tone music corresponding to the current context.

21. The apparatus for setting a color ring back tone according to claim 20, wherein the processor is further configured to:

determine, according to the correspondence, a color ring back tone identifier corresponding to a current context identifier, wherein the correspondence comprises a context identifier and a color ring back tone identifier corresponding to the context identifier; and set the color ring back tone of the terminal device to color ring back tone music indicated by the color ring back tone identifier.

22. The apparatus for setting a color ring back tone according to claim 20, wherein the processor is further configured to:

determine, according to the correspondence, an address of color ring back tone music corresponding to a current context identifier, wherein the correspondence comprises a context identifier and an address of color ring back tone music corresponding to the context identifier; and set the color ring back tone of the terminal device to color ring back tone music stored in the address of the color ring back tone music.

23. The apparatus for setting a color ring back tone according to claim 20, wherein the apparatus further comprises a receiver configured to receive context information entered by a user, wherein the context information is used to indicate a corresponding context, and wherein the processor is further configured to:

acquire a first color ring back tone music set matching the context information entered by the user, wherein the first color ring back tone music set comprises M pieces of color ring back tone music, and wherein M is greater than or equal to 1;

recommend N pieces of color ring back tone music in the first color ring back tone music set to the user for user selection, wherein N is greater than or equal to 1, and wherein N is less than or equal to M, and wherein the apparatus further comprises a memory configured to store a correspondence between color ring back tone music selected by the user and the context information entered by the user.

24. The apparatus for setting a color ring back tone according to claim 23, wherein the processor is further configured to acquire the first color ring back tone music set whose semantic relevancy between a label of color ring back tone music and the context information entered by the user is greater than a first preset threshold.

25. The apparatus for setting a color ring back tone according to claim 24, wherein the processor is further configured to:

analyze a use record of the user using a data analysis technology, so as to obtain a music type that the user is interested in, wherein the use record of the user comprises any one or any combination of the following: a color ring back tone use record of the user and a color ring back tone music listening record of the user; and acquire, from the music type that the user is interested in, the first color ring back tone music set whose semantic relevancy between the label of the color ring back tone music and the context information entered by the user is greater than the first preset threshold.

26. The apparatus for setting a color ring back tone according to claim 23, wherein the processor is further configured to:

sort all color ring back tone music in the first color ring back tone music set in a descending order according to a popularity degree; and select and recommend the first N pieces of color ring back tone music for user selection, and wherein the popularity degree is determined by any one or more of the following factors: a quantity of access times within a fixed period of time, a quantity of access users, and access frequency per unit time.

27. The apparatus for setting a color ring back tone according to claim 19, wherein the processor is further configured to:

acquire a second color ring back tone music set matching the current context, wherein the second color ring back tone music set comprises Q pieces of color ring back tone music, and Q is greater than or equal to 1; and recommend P pieces of color ring back tone music in the second color ring back tone music set to the user for user selection, wherein P is greater than or equal to 1, and wherein P is less than or equal to Q; and set the color ring back tone of the terminal device to color ring back tone music selected by the user.

28. The apparatus for setting a color ring back tone according to claim 27, wherein the processor is further configured to acquire the second color ring back tone music set whose semantic relevancy between a label of color ring back tone music and the current context is greater than a second preset threshold.

29. The apparatus for setting a color ring back tone according to claim 28, wherein the processor is further configured to:

analyze a use record of the user using a data analysis technology, so as to obtain a music type that the user is interested in, wherein the use record of the user comprises any one or any combination of the following: a color ring back tone use record of the user and a color ring back tone music listening record of the user; and acquire, from the music type that the user is interested in, the second color ring back tone music set whose semantic relevancy between the label of the color ring back tone music and the current context is greater than the second preset threshold.

30. The apparatus for setting a color ring back tone according to claim 27, wherein the processor is further configured to:

sort all color ring back tone music in the second color ring back tone music set in a descending order according to a popularity degree; and select and recommend the first P pieces of color ring back tone music for user selection, and wherein the popularity degree is determined by any one or more of the following factors: a quantity of access times within a fixed period of time, a quantity of access users, and access frequency per unit time.

31. The apparatus for setting a color ring back tone according to claim 27, wherein the apparatus further comprises a memory configured to store a correspondence between the color ring back tone music selected by the user and the current context, so that when the terminal device is in the current context next time, the color ring back tone is set, according to the correspondence, to the color ring back tone music that is selected by the user and that corresponds to the current context.

32. The apparatus for setting a color ring back tone according to claim 19, wherein the processor is further configured to notify the user that the color ring back tone of the terminal device is already set to the color ring back tone music corresponding to the current context.

33. An apparatus for determining color ring back tone music, comprising:

at least one processor configured to:

acquire a current value of a context parameter of a terminal device, wherein the context parameter indicates a characteristic of a context in which the terminal device is applied, and wherein the context parameter comprises any one or any combination of the following: a location parameter, an activity parameter, and an environmental parameter;

determine a current context of the terminal device according to the current value of the context parameter;

acquire a color ring back tone music set corresponding to the current context, wherein the color ring back tone music set comprises one or more pieces of color ring back tone music; and provide all or some music in the color ring back tone music set for a user, so that the user determines, from the color ring back tone music set, color ring back tone music corresponding to the current context.

34. The apparatus for determining color ring back tone music according to claim 33, wherein the processor is further configured to acquire the color ring back tone music set whose semantic relevancy between a label of color ring back tone music and the current context is greater than a preset threshold.

35. The apparatus for determining color ring back tone music according to claim 34, wherein the processor is further configured to:
analyze a use record of the user using a data analysis technology, so as to obtain a music type that the user is interested in, wherein the use record of the user comprises any one or any combination of the following: a color ring back tone use record of the user and a color ring back tone music listening record of the user; and
acquire, from the music type that the user is interested in, the color ring back tone music set whose semantic relevancy between the label of the color ring back tone music and the current context is greater than the preset threshold.

36. The apparatus for determining color ring back tone music according to claim 33, wherein the processor is further configured to:
sort all U pieces of color ring back tone music in the color ring back tone music set in a descending order according to a popularity degree; and
select the first W pieces of color ring back tone music and provide them for the user, so that the user determines, from the W pieces of color ring back tone music, the color ring back tone music corresponding to the current context, wherein U is greater than or equal to 1, and wherein W is greater than or equal to 1 and less than or equal to U, and
wherein the popularity degree is determined by any one or more of the following factors: a quantity of access times within a fixed period of time, a quantity of access users, and access frequency per unit time.

* * * * *